US007609392B2

(12) United States Patent
Yaqoob et al.

(10) Patent No.: US 7,609,392 B2
(45) Date of Patent: Oct. 27, 2009

(54) HARMONICALLY MATCHED DIFFRACTION GRATING PAIR

(75) Inventors: Zahid Yaqoob, Pasadena, CA (US);
Jigang Wu, Pasadena, CA (US);
Marinko Sarunic, Pasadena, CA (US);
Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 51 days.

(21) Appl. No.: 11/770,553

(22) Filed: Jun. 28, 2007

(65) Prior Publication Data

US 2008/0002209 A1    Jan. 3, 2008

Related U.S. Application Data

(60) Provisional application No. 60/833,748, filed on Jul. 27, 2006, provisional application No. 60/817,053, filed on Jun. 28, 2006.

(51) Int. Cl.
*G01B 9/02* (2006.01)
(52) U.S. Cl. .................................. 356/521; 356/520
(58) Field of Classification Search ................ 356/499, 356/520, 521; 250/237 G; 359/566, 569, 359/572
See application file for complete search history.

(56) References Cited

U.S. PATENT DOCUMENTS 3,829,219 A * 8/1974 Wyant ........................ 356/489
4,653,921 A * 3/1987 Kwon ......................... 356/521
6,307,635 B1 * 10/2001 Goldberg .................... 356/521
6,879,427 B2 * 4/2005 Mendlovic et al. .......... 359/279
2006/0268408 A1 * 11/2006 Toussaint et al. ............ 359/487

OTHER PUBLICATIONS

J. C. Shaw, "Metrology using differential phase-contrast microscopy," Microelectron. Eng. 13, 527-530 (1991).
P. J. McMahon, E. D. Barone-Nugent, B. E. Allman, and K. A. Nugent, "Quantitative phase-amplitude microscopy II: differential interference contrast imaging for biological TEM," J. of Microsc.-Oxford 206, pt. 3, 204-208 (2002).
F. Zernike, "Phase contrast, a new method for the microsopic observation of transparent objects," Physica 9, No. 7, 686-698 (1942).
F. Zernike, "Phase contrast, a new method for the microscopic observation of transparent objects Part II," Physica 9, No. 10, 974-986 (1942).

(Continued)

*Primary Examiner*—Michael A Lyons
(74) *Attorney, Agent, or Firm*—Gates & Cooper LLP

(57) ABSTRACT

A method and device realize shallow gratings-based planar beam splitter/combiner. Non-trivial phase shifts between different ports of resulting interferometers are used to acquire full-field phase measurements. The non-trivial phase shifts between different ports of the planar beam splitter/combiner can be adjusted by simply shearing one grating with respect to the second grating. The two shallow diffraction gratings are harmonically-related and can be recorded on a single substrate for compact interferometric based schemes. During the recording process, the two gratings are aligned such that the grating planes and the grating vectors are parallel to that of each other. The relative phase of the recording beams controls the shearing between the recorded harmonically-related shallow phase gratings. The relative shearing of the two gratings defines the non-trivial phase shift between different ports of the compact planar beam splitter/combiner.

14 Claims, 10 Drawing Sheets

OTHER PUBLICATIONS

W. Shimada, T. Sato, and T. Yatagai, "Optical surface microtopography using phase-shifting Nomarski microscope," Proc. SPIE 1332, 525-529 (1990).

P. Hariharan, and M. Roy, "Achromatic phase-shifting for two-wavelength phase-stepping interferometry," Opt. Comm. 126, 220-222 (1996).

C. J. Cogswell, N. I. Smith, K. G. Larkin, and P. Hariharan, "Quantitative DIC microscopy using a geometric phase shifter," Proc. SPIE 2984, 72-81 (1997).

M. R. Arnison, C. J. Cogswell, N. I. Smith, P. W. Fekete, and K. G. Larkin, "Using the Hilbert transform for 3D visualization of differential interference contrast microscope images," J. of Microsc.-Oxford 199, pt. 1, 79-84 (2000).

M. R. Arnison, K. G. Larkin, C. J. R. Sheppard, N. I. Smith, and C. J. Cogswell, "Linear phase imaging using differential interference contrast microscopy," J. of Microsc.-Oxford 214, pt. 1, 7-12 (2004).

H. Ishiwata, M. Itoh, and T. Yatagai, "A new method of three-dimensional measurement by differential interference contrast microscope," Opt. Comm. 260, 117-126 (2006).

U. Schnars, and W. Juptner, "Direct Recording of Holograms by a Ccd Target and Numerical Reconstruction," Appl. Opt. vol. 33, No. 2, 179-181 (1994).

E. Cuche, F. Bevilacqua, and C. Depeursinge, "Digital holography for quantitative phase-contrast imaging," Opt. Lett. vol. 24, No. 5, 291-293 (1999).

G. Popescu, T. Ikeda, C. A. Best, K. Badizadegan, R. R. Dasari, and M. S. Feld, "Erythrocyte structure and dynamics quantified by Hilbert phase microscopy," J. Biomed. Opt. 10(6), (2005), pp. 060503-1-060503-3.

T. Ikeda, G. Popescu, R. R. Dasari, and M. S. Feld, "Hilbert phase microscopy for investigating fast dynamics in transparent systems," Opt. Lett. 30 (10), 1165-1167 (2005).

D. S. Marx, and D. Psaltis, "Polarization quadrature measurement of subwavelength diffracting structures," Appl. Opt. 36 (25), 6434-6440 (1997).

D. O. Hogenboom, C. A. DiMarzio, T. J. Gaudette, A. J. Devaney, and S. C. Lindberg, "Three-dimensional images generated by quadrature interferometry," Opt. Lett. 23 (10), 783-785 (1998).

M. A. Choma, "Instantaneous quadrature low-coherence interferometry with 3× 3 fiber-optic couplers," Opt. Lett. 28 (22), 2162-2164 (2003).

Z. Yaqoob, J. Fingler, X. Heng, and C. H. Yang, "Homodyne en face optical coherence tomography," Opt. Lett. 31(12), 1815-1817 (2006).

B. L. Danielson, and C. Y. Boisrobert, "Absolute optical ranging using low coherence interferometry," Appl. Opt. 30 (21), 2975-2979 (1991).

V. V. Tuchin, "Coherence-domain methods in tissue and cell optics," Laser Phys. 8 (4), 807-849 (1998).

S. R. Thurber, A. M. Brodsky, and L. W. Burgess, "Characterization of random media by low-coherence interferometry," Appl. Spectrosc. 54 (10), 1506-1514 (2000).

D. Huang, E. A. Swanson, C. P. Lin, J. S. Schuman, W. G. Stinson, W. Chang, M. R. Hee, T. Flotte, K. Gregory, C. A. Puliafito, and J. G. Fujimoto, "Optical coherence tomography," Science 254, 1178-1181 (1991).

C. M. B. Cordeiro, L. Cescato, A. A. Freschi, and L. F. Li, "Measurement of phase differences between the diffracted orders of deep relief gratings," Opt. Lett. 28 (9), 683-685 (2003).

P. Marquet, B. Rappaz, P. J. Magistretti et al., "Digital holographic microscopy: a noninvasive contrast imaging technique allowing quantitative visualization of living cells with subwavelength axial accuracy," Optics Letters 30 (5), 468-470 (2005).

T. Ikeda, G. Popescu, R. R. Dasari et al., "Hilbert phase microscopy for investigating fast dynamics in transparent systems," Optics Letters 30 (10), 1165-1167 (2005).

D. O. Hogenboom, C. A. DiMarzio, T. J. Gaudette et al., "Three-dimensional images generated by quadrature interferometry," Optics Letters 23 (10), 783-785 (1998).

Z. Yaqoob, J. G. Wu, X. Q. Cui et al., "Harmonically-related diffraction gratings-based interferometer for quadrature phase measurements," Optics Express 14 (18), 8127-8137 (2006).

J. Atencia and D. J. Beebe, "Controlled microfluidic interfaces," Nature 437, 648-655 (2005).

M. R. Hee, J. A. Izatt, J. M. Jacobson, J. G. Fujimoto, and E. A. Swanson, "Femtosecond Transillumination Optical Coherence Tomography," Optics Letters, vol. 18 (12), pp. 950-952 (1993).

A. F. Fercher, C. K. Hitzenberger, G. Kamp, and S. Y. Elzaiat, "Measurement of Intraocular Distances by Backscattering Spectral Interferometry," Optics Communications, vol. 117, pp. 43-48 (1995).

G. Hausler and M. W. Lindner, "Coherence Radar" and "Spectral Radar"—New Tools for Dermatological Diagnosis, Journal of Biomedical Optics, vol. 3 (1), pp. 21-31 (1998).

M. Wojtkowski, A. Kowalczyk, P. Targowski, and I. Gorczynska, "Fourier-domain optical coherence tomography: next step in optical imaging," Optica Applicata, vol. 32 (4), pp. 569-580 (2002).

R. Huber, M. Wojtkowski, K. Taira, J. G. Fujimoto, and K. Hsu, "Amplified, frequency swept lasers for frequency domain reflectometry and OCT imaging: design and scaling principles," Optics Express, vol. 13 (9), pp. 3513-3528 (2005).

M. A. Choma, M. Sarunic, C. Yang, and J. A. Izatt, "Sensitivity advantage of swept source and Fourier domain optical coherence tomography," Optics Express, vol. 11(18), pp. 2183-2189 (2003).

R. Leitgeb, C. K. Hitzenberger, and A. F. Fercher, "Performance of fourier domain vs. time domain optical coherence tomography," Optics Express, vol. 11(8), pp. 889-894 (2003).

J. F. de Boer, B. Cense, B. H. Park, M. C. Pierce, G. J. Tearney, and B. E. Bouma, "Improved signal-to-noise ratio in spectral-domain compared with time-domain optical coherence tomography," Optics Letters, vol. 28 (21), pp. 2067-2069 (2003).

S. Yun, G. Tearney, B. Bouma, B. Park, and J. F. de Boer, "High-speed spectral domain optical coherence tomography at 1.3 μm wavelength," Optics Express, vol. 11(26), pp. 3598-3604 (2003).

N. A. Nassif, B. Cense, T. C. Chen, M. C. Pierce, S.-H. Yun, B. H. Park, B. E. Bouma, G. J. Tearney, J. F. de Boer, "Ultrahigh-resolution high-speed retinal imaging using spectral-domain optical coherence tomography," Optics Express, vol. 12 (11), pp. 2435-2447 (2004).

M. Wojtkowski, V. J. Srinivasan, T. H. Ko, J. G. Fujimoto, A. Kowalczyk, and J. S. Duker, "Ultrahigh-resolution, high-speed, Fourier domain optical coherence tomography and methods for dispersion compensation," Optics Express, vol. 12 (11), pp. 2404-2422 (2004).

J. F. deBoer, T. E. Milner, M. J. C. vanGemert, and J. S. Nelson, "Two-dimensional birefringence imaging in biological tissue by polarization-sensitive optical coherence tomography," Optics Letters, vol. 22 (12), pp. 934-936 (1997).

J. A. Izatt, M. D. Kulkarni, S. Yazdanfar, J. K. Barton, and A. J. Welch, "In vivo bi-directional color Doppler flow imaging of picoliter blood volumes using optical coherence tomography," Optics Letters, vol. 22 (18), pp. 4139-4141 (1997).

R. Leitgeb, M. Wojtkowski, A. Kowalczyk, C. K. Hitzenberger, M. Sticker, and A. F. Fercher, "Spectral measurement of absorption by spectroscopic frequency-domain optical coherence tomography," Optics Letters, vol. 25 (11), pp. 820-822 (2000).

K. D. Rao, M. A. Choma, S. Yazdanfar, A. M. Rollins, and J. A. Izatt, "Molecular contrast in optical coherence tomography by use of a pump-probe technique," Optics Letters, vol. 28 (5), pp. 340-342 (2003).

M. Wojtkowski, A. Kowalczyk, R. Leitgeb, and A. F. Fercher, "Full range complex spectral optical coherence tomography technique in eye imaging," Optics Letters, vol. 27 (16), pp. 1415-1417 (2002).

R. A. Leitgeb, C. K. Hitzenberger, A. F. Fercher, and T. Bajraszewski, "Phase-shifting algorithm to achieve high-speed long-depth-range probing by frequency-domain optical coherence tomography," Optics Letters, vol. 28 (22), pp. 2201-2203 (2003).

E. Gotzinger, M. Pircher, R. A. Leitgeb, and C. K. Hitzenberger, "High speed full range complex spectral domain optical coherence tomography," Optics Express, vol. 13 (2), pp. 583-594 (2005).

A. H. Bachmann, R. A. Leitgeb, and T. Lasser, "Heterodyne Fourier domain optical coherence tomography for full range probing with high axial resolution," Optics Express, vol. 14 (4), pp. 1487-1496 (2006).

M. A. Choma. et al., "Instantaneous quadrature low-coherence interferometry with 3×3 fiber-optic couplers," Optics Letters, vol. 28 (22), pp. 2162-2164 (2003).

M. V. Sarunic, M. A. Choma, C. H. Yang, and J. A. Izatt, "Instantaneous complex conjugate resolved spectral domain and swept-source OCT using 3×3 fiber couplers," *Optics Express*, vol. 13 (3), pp. 957-967 (2005).

Z. Yaqoob, J. Wu, X. Cui, X. Heng, and C. Yang, "Harmonically-related diffraction gratings-based interferometer for quadrature phase measurements," *Optics Express*, 14(18), pp. 8127-8137 (2006).

J. M. Herrmann, M. E. Brezinski, B. E. Bouma, S. A. Boppart, C. Pitris, J. F. Southern, and J.G. Fujimoto, "Two- and three-dimensional high-resolution imaging of the human oviduct with optical coherence tomography,"*Fertility and Sterility*, vol. 70 (1), pp. 155-158 (1998).

C. K. Hitzenberger, P. Trost, P. W. Lo, and Q. Y. Zhou, "Three-dimensional imaging of the human retina by high-speed optical coherence tomography," *Optics Express*, vol. 11 (21), pp. 2753-2761 (2003).

G. J. Tearney, B. E. Bouma, and J. G. Fujimoto, "High-speed phase- and group-delay scanning with a grating-based phase control delay line," *Optics Letters*, vol. 22 (23), pp. 1811-1813 (1997).

A. M. Rollins, M. D. Kulkarni, S. Yazdanfar, R. Ung-arunyawee, and J. A. Izatt, "In vivo video rate optical coherence tomography," *Optics Express*, vol. 3 (6), pp. 219-229 (1998).

\* cited by examiner (a)

(b)

(a)

(b)

HARMONICALLY MATCHED DIFFRACTION GRATING PAIR

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/817,053, filed on Jun. 28, 2006, by Zahid Yaqoob, Jigang Wu, and Changhuei Yang, entitled "DIFFRACTION GRATINGS-BASED INTERFEROMETER FOR QUADRATURE PHASE MEASUREMENTS," and U.S. Patent Application Ser. No. 60/833,748, filed on Jul. 27, 2006, by Zahid Yaqoob, Marinko Sarunic, and Changhuei Yang, entitled "HARMONICALLY RELATED GRATINGS-BASED FULL-RANGE OPTICAL COHERENCE TOMOGRAPHY,".

STATEMENT REGARDING FEDERALLY SPONSORED RESEARCH AND DEVELOPMENT

The U.S. Government has certain rights in this invention pursuant to Grant No. BES-0547657 awarded by the National Science Foundation.

BACKGROUND OF THE INVENTION

1. Field of the Invention

The present invention relates generally to phase-based imaging techniques, and in particular, to a method, apparatus, and article of manufacture for achieving non-trivial interference phase shifts using a harmonically-matched diffraction grating pair.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Full field phase based imaging techniques [B1][B2][B3][B4] are important for a wide range of applications, such as microscopy and metrology. These methods generally involve interferometry and incorporate some form of non-trivial encoding (e.g., time, space, or polarization) for phase extraction. The encoding process entails either a more complicated experimental scheme or computationally intensive post-processing. In this context, a full field interferometry scheme where the resulting interference outputs are naturally in or close to quadrature can simplify phase imaging. However, this requirement is non-trivial. In fact, the outputs of any two port non-lossy interferometer schemes, which include Michelson, Mach-Zehnder and Sagnac schemes, are constrained to be 180° shifted (trivial) by energy conservation.

In addition to the above, it may be desirable to obtain high resolution depth-resolved phase and amplitude information of turbid samples (such as tissue). Spectrometer based solutions used to provide such information provide inadequate sensitivity as a function of pathlength difference between the sample and reference arms.

To better understand the problems of the prior art, a detailed description of phase measurements, the phase of diffracted light, single grating based Michelson interferometers, and optical coherence tomography are described in detail below.

Phase Measurements

As described above, highly accurate amplitude and phase measurements of optical signals are important in many applications ranging from metrology [A1] to cell biology [A2]. Traditional phase-contrast imaging techniques such as Zernike phase [A3,A4] and Nomarski differential interference contrast (DIC) [A5] render excellent phase contrast images; however, the phase information is only qualitative in nature. To retrieve quantitative phase information in Nomarski DIC, several approaches have been proposed that include: DIC with changing shear direction [A6], phase shifting DIC [A7,A8], and non-iterative phase reconstruction methods such as half-plane Hilbert transform [A9]. In addition, Arnison et al. proposed a method that combined DIC microscopy with phase shifting, shear rotation, and Fourier phase integration to yield linear phase image of a sample [A10]. Recently, Ishiwata et al. have developed retardation-modulated DIC—a method to extract the phase component from the DIC image using two images with different retardation [A11].

Other methods for quantitative phase imaging (QPI) include digital holography [A12, A13], Hilbert phase microscopy (HPM) [A14, A15], and polarization based techniques [A16, A17]. Interference microscopy techniques based on PSI generally require recording of four interferograms with precise π/2 phase shifts of the reference field, adding complexity to the system while others can be computation extensive. HPM and digital holography are simpler as they require only one interferogram for QPI. It is to be noted that the methods depend on recording of high frequency spatial fringes for successful phase unwrapping. It may also be noted that multiport fiber based systems such as 3×3 couplers can provide non-trivial phase difference, which can be manipulated for quadrature phase measurements [A18, A19]. However, free space equivalents of a 3×3 coupler do not exist.

Phase of Diffracted Light in Shallow Gratings

The phase of transmitted/reflected and diffracted light in shallow diffraction gratings is a well understood quantity. However, for the sake of completeness, a brief account of how a diffraction grating affects the phase of light is described herein. Consider FIG. 1, which illustrates spatial phase modulation in a sinusoidal phase grating.

The complex transmittance of a sinusoidal phase grating can be expressed as:

$$t(x) = \exp\left\{j\alpha\cos\left(\frac{2\pi}{\Lambda}(x+x_o)\right)\right\}, \tag{1}$$

where $\alpha$, $\Lambda$, and $x_o$ are the amplitude of phase modulation, period, and displacement from the origin along x-direction, respectively, of the phase grating.

Defining $\xi(x_o)=2\pi x_o/\Lambda$, Eq. (1) can be rewritten in the form:

$$t(x) = \sum_{m=-\infty}^{\infty} J_m(\alpha)\exp\left\{jm\left(\frac{2\pi}{\Lambda}x+\xi(x_o)+\frac{\pi}{2}\right)\right\}, \tag{2}$$

where $J_m(\alpha)$ is mth order Bessel function of the first kind.

Using the identity $J_{-m}(\alpha)=(-1)^m J_m(\alpha)$, the relative phase of the $m^{th}$ diffracted order with respect to the zeroth order is given by:

$$\phi(x_o) = \begin{cases} m\{\xi(x_o) + \frac{\pi}{2}\}, & m \geq 1 \\ |m|\{-\xi(x_0) + \frac{\pi}{2}\}, & m \leq -1 \end{cases} \quad (3)$$

It may be noted that for shallow phase gratings, Eq. (3) holds regardless of the grating profile [A24].

Single Grating Based Michelson Interferometer

Diffraction gratings can be used as beam splitters in different interferometric designs. As described above, the diffracted light in diffraction gratings acquires a unique phase with respect to the undiffracted light. Moreover, this distinct phase $\phi(x_o)$ can be adjusted by translating the diffraction grating in x-direction [see Eq. (3)]. However, the phase shifts between different output ports of single grating-based Michelson/Mach-Zehnder interferometers are only trivial in nature. To better understand this phenomenon and the operation of the invention's harmonically-related gratings-based interferometer, a simpler system is described herein—a Michelson interferometer based on a single shallow diffraction grating $G_1$ [see FIG. 2(a,b)].

FIG. 2.(a,b) illustrates a schematic of a Michelson interferometer using a single shallow diffraction grating, $G_1$. FIG. 2(a) illustrates the transmitted sample and diffracted reference beams with path lengths $d_1$ and $d_2$, respectively. FIG. 2(b) shows dashed lines representative of coincident sample and reference beam at output ports I, II, and III of the interferometer. FIG. 2(c) shows phase shift of the diffracted beam with respect to the undiffracted beam during the first diffraction. FIGS. 2(d,e) show phase shifts of the diffracted sample and reference beams, respectively, during the second diffraction. $x_1$ is the actuation of grating $G_1$ along the x-direction for the experiment. $M_i$: ith Mirror; BS: Beam splitter.

In the arrangement shown in FIG. 2(a), a collimated beam from a laser source is directed at normal incidence at $G_1$, which acts as a beam splitter during the first diffraction. Only two beams are considered, i.e., the zeroth order and a first order diffracted beam which form the sample and reference arms, respectively, of the Michelson interferometer. It is to be noted that the grating period $\Lambda_1$ can be chosen so that only the zeroth and the first order diffracted beams exist. Mirror $M_1$ is shown as the sample whereas $M_2$ represents the reference mirror. The returning sample and reference beams reach the grating $G_1$ and undergo a second diffraction. This time, the grating acts both as a beam splitter as well as a combiner, since it splits and combines the incoming sample and reference beams at the three output ports I, II, and III of the interferometer. The coincident reference and sample beams at the three ports are shown as dashed lines [see FIG. 2(b)]. A beam splitter (BS) is used to separate the output beam at port II from the input beam.

In the context of FIGS. 2(c)-(e), which illustrate the phase of the diffracted beams with respect to the undiffracted beams during the two passes, the total electric field at port I of the single grating-based interferometer can be written as:

$$E_1 = E_1 \exp\{i(2kd_1-\xi_1(x_1)+\pi/2)\} \rightarrow \text{Field comp. from the sample arm} + E_2 \exp\{i(2kd_2+\xi_1(x_1)+\pi/2)\}, \rightarrow \text{Field comp. from the reference arm} \quad (4)$$

where $E_1$ and $E_2$ are the amplitudes of the field components reaching port I from the sample and reference arms, respectively. k is the optical wave vector, and the parameters $d_1$ and $d_2$ correspond to the path lengths of the sample and reference arms, respectively. Moreover, $\xi_1(x_1)=2\pi x_1/\Lambda_1$, where $x_1$ is the displacement of the grating $G_1$. Therefore, using $E_I E_I^*$, the interference signal at port I of the interferometer can be written as:

$$i_I = 2A_1 \cos\{2k(d_2-d_1)+2\xi_1(x_1)\}, \quad (5a)$$

Similarly, the interference signals at ports II and III of the interferometer can be written as:

$$i_{II} = 2A_2 \cos\{2k(d_2-d_1)+2\xi_1(x_1)+\pi\}, \quad (5b)$$

$$i_{III} = 2A_3 \cos\{2k(d_2-d_1)+2\xi_1(x_1)+\pi\}. \quad (5c)$$

respectively. The parameters $A_i$, i=1, 2, 3 are the amplitudes of the interference signals at ports I, II, and III, respectively, and depend upon the diffraction efficiency of the grating $G_1$. It is clear from Eq. (5) that ports II and III of a single shallow grating-based Michelson interferometer are in phase whereas the port I of the interferometer is 180° out of phase with respect to the other two output ports. This geometry is therefore unsuitable for extracting quadrature signals.

To corroborate the above discussion, an experimental setup may be constructed using a collimated beam ($1/e^2$ diameter≈1 mm) from a HeNe laser ($\lambda$=633 nm) and a shallow 600 grooves/mm blazed transmission grating (Thorlabs, Inc., GT25-06V). The reference mirror is mounted on a voice coil to modulate the reference arm. Heterodyne interference signals are acquired at the three output ports using New Focus photodetectors (model 2001) and a 16-bit analog-to-digital converter (National Instruments, model PXI-6120). The grating is mounted on a computer-controlled piezo actuator (25.5 nm/V) in order to measure the phase shifts between different ports of the interferometer for various positions of the grating. For each position of the grating, DC components are removed from the acquired heterodyne signals at the three ports; the resulting interference signals, represented by Eqs. 5(a)-(c), are subsequently processed to determine the phase shifts between the output ports.

FIG. 3 illustrates the measured phase shifts between different ports of a single grating-based Michelson interferometer versus grating displacement ($x_1$) along the x-direction. More specifically, FIG. 3 shows the measured phase shifts between different output ports of the interferometer versus grating displacement over 3.5 microns (~2 grating periods) along the $x_1$ direction specified in FIGS. 2(a,b). As expected, ports II and III are in phase whereas port I is ~180° out of phase with respect to the ports II and III, indicating that a single shallow diffraction grating-based Michelson interferometer cannot provide but trivial phase shifts between different output ports. Although, p-polarized light can be used in the above described reported experiment (see results in FIG. 3), similar results may be observed for a s-polarized light.

Optical Coherence Tomography

Embodiments of the invention relate generally to low coherence interferometry systems and methods, and more particularly to optical coherence tomography (OCT)—a method for obtaining high resolution depth-resolved phase and amplitude information of turbid samples (such as tissue). The reported methods for depth-resolved imaging include time-domain (TD) [C1, C2] and spectral domain (SD) [C3-C6] OCT (which includes both spectrometer as well as swept-source based OCT systems). The later technique, i.e., SDOCT, offers increased sensitivity [C7-C9] compared with the earlier method (TDOCT). This increased sensitivity can be translated into a higher OCT scan acquisition rate [C10-

C13], decrease in the light fluence level, greater depth penetration, or to boost the sensitivity of the various functional OCT methods [C14-C17].

The SDOCT scheme is very similar to that of a typical TDOCT scheme except that a moving reference mirror is immobilized and the detector is replaced by a low-loss spectrometer. The spectrometer is used to record the spectral variation (also known as spectral interferogram or spectrogram) of the detected signal. Moreover, the depth resolved structural information is retrieved by performing a Fourier transform of the acquired spectrogram. Since a typical SDOCT system measures only the real part of the complex cross-spectral density, the Fourier transform of the real valued spectrum yields redundant information for positive and negative spatial frequencies corresponding to positive and negative path length differences between sample and reference arms. To keep the mirrored representations in the two adjacent Fourier half spaces from mixing with each other, the reference arm delay is typically kept slightly shorter than the relative distance of the first sample interface. Thus, only half of the Fourier space can be used to retrieve the sample structural information. This ambiguity can be resolved by acquiring (or reconstructing) the complex signal, resulting in a signal space that is double in range.

In spectrometer-based SDOCT systems, the sensitivity [also known as signal-to-noise-ratio (SNR)] is not the same through the whole depth scan range. Instead, it drops as the path length difference between reference and sample arms increases. This SNR drop-off can be as serious as ~20 dB over the scan range of 2-3 mm. The ability to record or reconstruct complex signal can therefore significantly improve the performance of spectrometer-based SDOCT systems by increasing the effective or overall depth scan range.

The most common method for complex signal acquisition involves acquisition of phase-shifted interferograms. Several different approaches have been proposed and demonstrated for reference beam phase-shifting, which include piezo-driven reference mirror [C18, C19], electro-optic modulator [C20], and acousto-optic modulators [C21]. Typically, three or more spectral interferograms shifted by $\pi/2$ are recorded in a serial fashion in the above methods. Another approach involves the use of multiport fiber-based systems such as 3×3 couplers, which inherently exhibit non-trivial phase difference between the different ports, for complex signal acquisition [C22-C24]. An advantage of the above technique is that it can simultaneously acquire the phase-shifted signals without any optical or electronic modulation as in the previously mentioned OCT systems. Simultaneous acquisition of phase-shifted spectral interferograms is also important as it keeps the reconstructed full-range image from corrupting due to the sub-wavelength sample motion or interferometric drift. It may be noted, however, that the free space equivalents of a 3×3 coupler do not exist.

SUMMARY OF THE INVENTION

In summary, one or more embodiments of the invention demonstrate the use of planar shallow diffraction gratings in a modified Michelson interferometric setup to achieve non-trivial phase shifts between different output ports. The phase shift is adjusted by simply shearing the gratings with respect to each other. The ability to adjust the phase shifts between different ports of the interferometer is a useful feature of the design for quadrature phase interferometry. One advantage of the proposed method for non-trivial phase is that the shearing of the gratings does not change the path length relationship between interference beams at the output ports of the interferometer—an advantage for metrology and low coherence interferometry applications. It is to be noted that a single shallow diffraction grating-based Michelson interferometer cannot provide but trivial phase shifts between different output ports; hence, it is not suitable for quadrature phase measurements.

In view of the above, embodiments of the invention further provide the ability to construct a full-field quadrature interferometer based on a harmonically matched grating pair as the beam splitter/combiner with which quantitative phase and intensity information associated with a transmissive sample can be measured directly without temporal, spatial, or polarization encoding.

As a method, embodiments of the invention possess numerous advantages. First, the implementation and the processing of measurements to extract phase and amplitude information are both relatively simple and easy to implement. Second, the method may be adapted for soft X-ray quadrature phase imaging. While a wide range of optical elements do not have effective soft X-ray regime equivalents and as such a range of optical techniques cannot be translated for X-ray applications, an x-ray regime version of the diffraction grating pair can be manufactured with current fabrication technology. Third, unlike a conventional beamsplitter, a harmonic grating pair is flat and, as such can be directly fabricated into a layered microstructure with ease. An on-chip quadrature phase imaging system can be very useful as an underlying base of a microfluidic device for providing a convenient and direct means to monitoring flow dynamics in microfluidic flows.

BRIEF DESCRIPTION OF THE DRAWINGS

Referring now to the drawings in which like reference numbers represent corresponding parts throughout:

FIG. 2(a) illustrates the transmitted sample beam (path length $d_1$) and the diffracted reference beam (path length $d_2$). FIG. 2(b) shows dashed lines representative of coincident sample and reference beam at output ports I, II, and III of the interferometer. FIG. 2(c) shows a prior art phase shift of the diffracted beam with respect to the undiffracted beam during the first diffraction. FIGS. 2(d,e) show prior art phase shifts of the diffracted sample and reference beams, respectively, during the second diffraction.

In FIG. 7(a), the interference outputs of a single grating based interferometer can only possess a π phase difference. In FIG. 7(b), a combined harmonically related grating illustrates the introduction of non-trivial phase shift between the interference outputs.

FIG. 9(a) illustrates an intensity image; 9(b) a phase image; 9(c) a schematic of the phase object; 9(d) a quantitative phase value compared with the profilometry result;

FIG. 10(a) illustrates fluid mixing in a microfluidic channel (salt water in the middle and water on either side). The location of acquired images illustrated in FIGS. 10(b)-10(g) is indicated in FIG. 10(a). FIGS. 10(b)-10(d) illustrate intensity images that are acquired in three different locations as indicated in FIG. 10(a). FIGS. 10(e)-10(g) illustrate corresponding phase images of FIGS. 10(b)-10(d).

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the present invention provide a new method for obtaining non-trivial phase difference between the output ports of a reflectance based interferometer through the use of shallow diffraction gratings. It may be shown that as opposed to a single shallow diffraction grating-based interferometer (which provides only trivial phase shifts), a pair of harmonically-related shallow diffraction gratings can be used to realize a modified Michelson interferometer where the phase shifts between different output ports can be adjusted. More importantly, the phase shift can be adjusted by simply shearing one grating with respect to the other. This approach does not change the path length relationships of the different interference beams within the interferometer—an advantage for metrology [A1] and low coherence interferometry applications [A20-A23].

In addition to the above, embodiments of the invention demonstrate the use of shallow diffraction gratings for quadrature phase interferometry. A single shallow diffraction grating-based Michelson interferometer yields only trivial (0° or 180°) phase shift between different output ports. In comparison, a combination of two parallel shallow diffraction gratings can be useful to achieve desired phase shifts (e.g., 90° for quadrature phase interferometry). It can be shown that the phase at different output ports of a grating-pair based interferometer can be adjusted by shearing the two gratings with respect to each other. Two harmonically-related diffraction gratings are used to demonstrate phase shift control at the output ports of a modified Michelson interferometer.

In view of the above, embodiments of the invention provide a quadrature free-space phase interferometer, termed G1G2 interferometer, with a pair of harmonically related shallow diffraction gratings [B5]. Such an interferometer may be created using a harmonically related grating pair on a single holographic plate. Further, such a single optical element may be used in place of a beamsplitter in a modified Mach-Zehnder interferometer thereby providing an observation of non-trivial phase between the outputs. In addition, full-field phase imaging may be demonstrated. Such an imaging demonstration additionally illustrates the utility of the phase imaging for flow dynamics studies.

Harmonically-Related Grating Pair Based Michelson Interferometer

Figure 1:
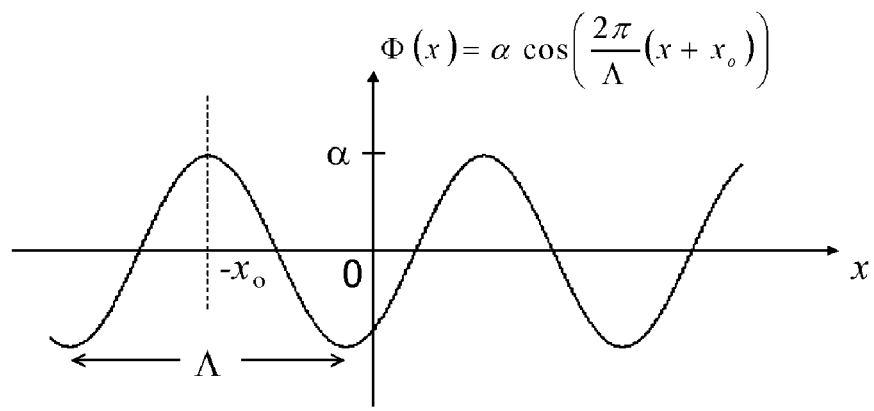
FIG. 1 illustrates a spatial phase modulation in a sinusoidal phase grating.
Figure 2:
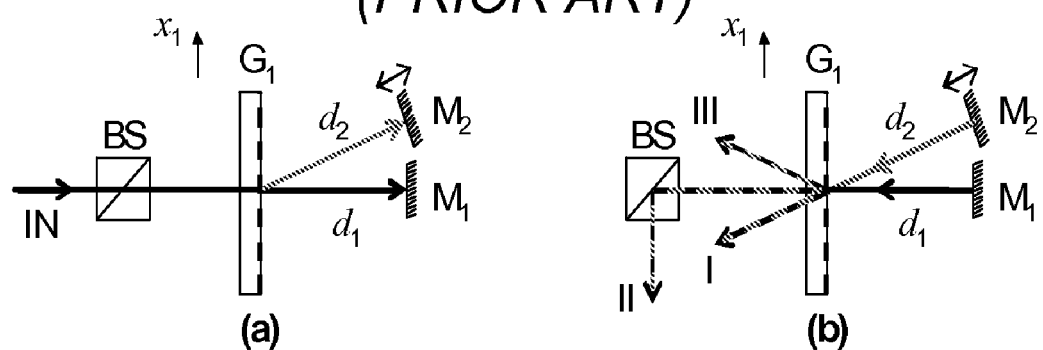
FIG. 2(a,b) illustrates a schematic of a prior art Michelson interferometer using a single shallow diffraction grating, $G_1$.
Figure 2:
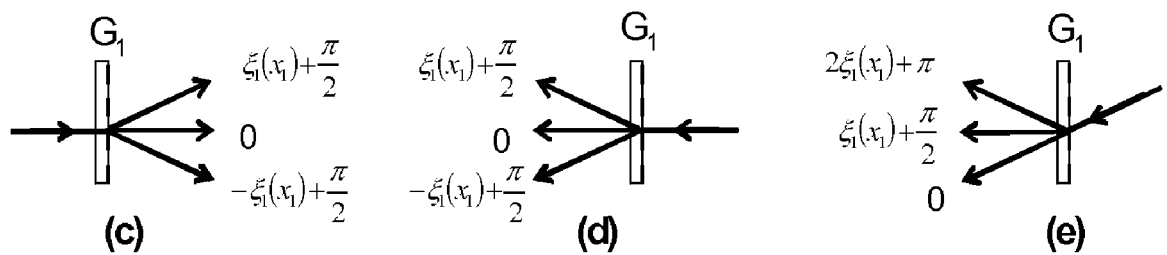
Figure 3:
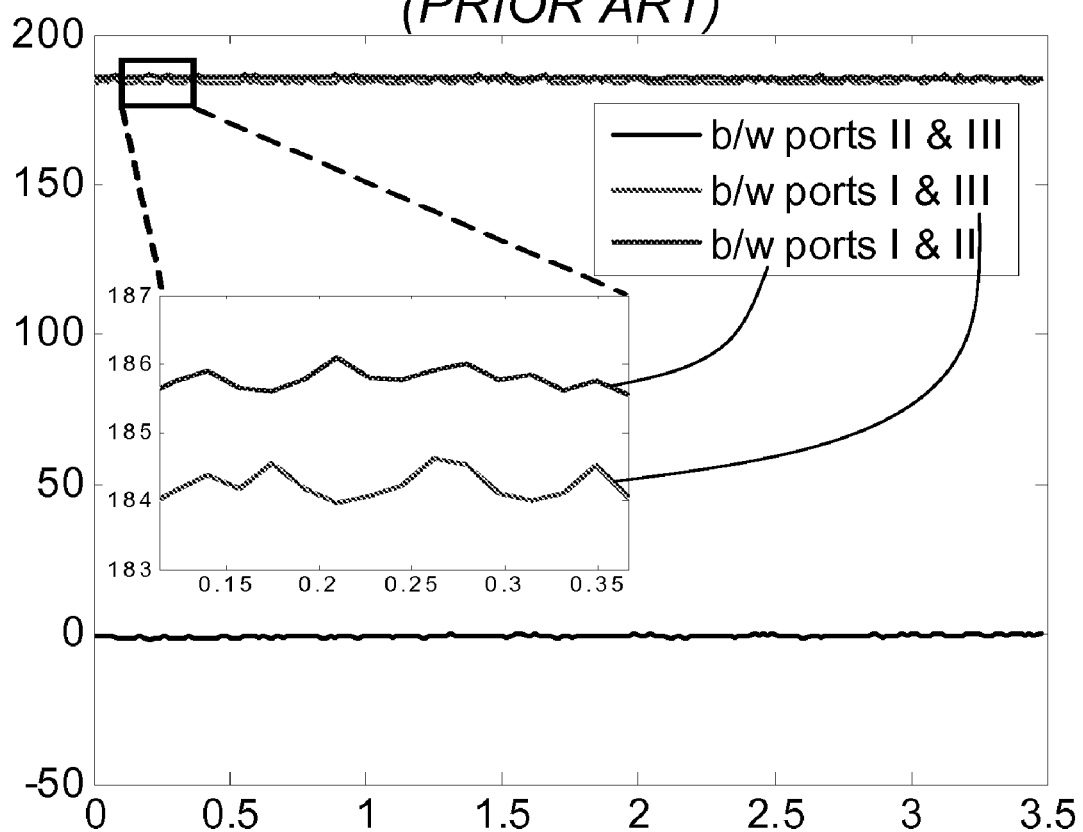
FIG. 3 illustrates the measured phase shifts between different ports of a single grating-based prior art Michelson interferometer versus grating displacement ($x_1$) along the x-direction.

As illustrated by Eqs. 5(a)-(c), a non-trivial phase shift given by $2\xi_1(x_1)$ is conferred on the interference term associated with each output port of a single-grating based interferometer. Since the amount of non-trivial phase shift is the same for each output port, the configuration shown in FIGS. 2(a,b) yields only trivial phase difference between the output ports. This illustrates that it is not possible for a single shallow grating based interferometer, the Michelson interferometer described above or the Mach Zehnder configuration described in [A24], to operate as a quadrature phase interferometer.

Figure 4:
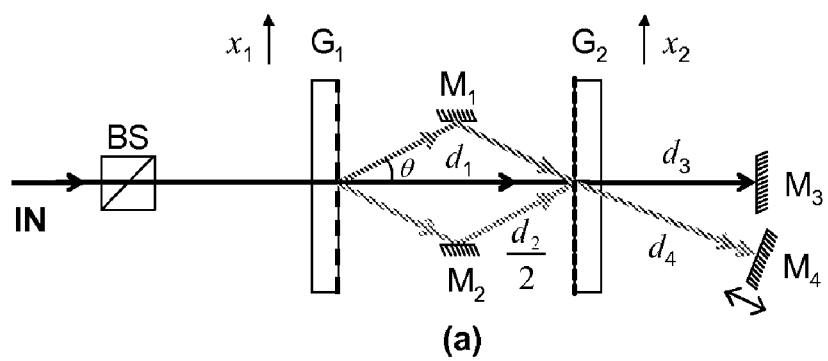
FIGS. 4(a) and 4(b) illustrate a modified Michelson interferometer design based on two harmonically-related shallow transmission gratings in accordance with one or more embodiments of the invention.
FIG. 4(c)-4(h) illustrate phase shifts of the diffracted and undiffracted light during the first and second diffractions at gratings $G_1$ and $G_2$ of the Michelson interferometer of FIGS. 4(a) and 4(b) in accordance with one or more embodiments of the invention.
Figure 4:
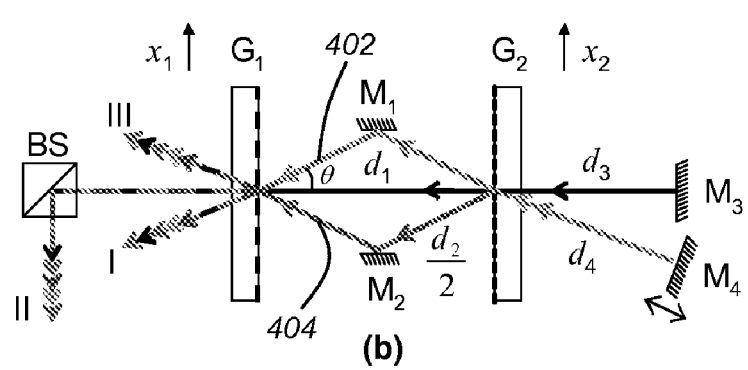
Figure 4:
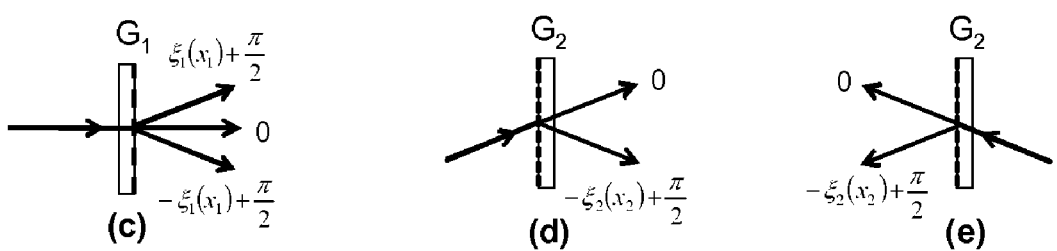
Figure 4:
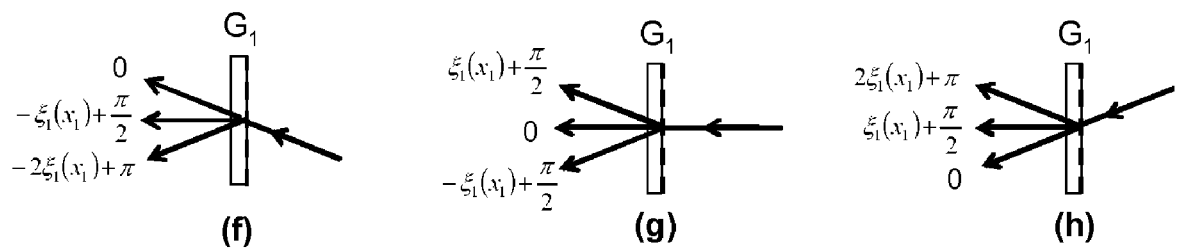

Fortunately, this effect does not extend to interferometers that contain two or more shallow gratings. In one or more embodiments of the invention, a modified Michelson interferometer based on two harmonically-related shallow diffraction gratings [see FIG. 4(a,b)] can be created that can be adjusted to form a quadrature phase interferometer. In this regard, FIGS. 4(a) and 4(b) illustrate a modified Michelson interferometer design based on two harmonically-related shallow transmission gratings, where $d_1$ is the inter-grating distance and θ is the angle of diffraction. FIG. 4(c)-4(h) illustrate phase shifts of the diffracted and undiffracted light during the first and second diffractions at gratings $G_1$ and $G_2$. $x_1$ and $x_2$ correspond to the actuations of grating $G_1$ and $G_2$, respectively. Parameters $d_3$ and $d_4$ represent path lengths of the sample and reference arms, respectively. $M_i$: ith Mirror; BS: Beam splitter.

In one or more embodiments of the invention the period of first grating $G_1$ is twice the period of the second grating $G_2$. The two gratings are placed at distance $d_1$ and aligned such that the grating planes as well as grating vectors are parallel to that of each other. Two mirrors $M_1$ and $M_2$ are introduced in the setup and aligned such that the first order diffracted beams (solid green and red lines) from $G_1$ meet with the undiffracted beam (solid black line) at $G_2$ [see FIG. 4(a)]. Moreover, the angle of incidence for the two beams at $G_2$ is the same as the angle of diffraction θ at $G_1$.

For a given inter-grating distance $d_1$, the two first order diffracted beams will travel the same distance $d_2=d_1/\cos(\theta)$ between $G_1$ and $G_2$. The grating $G_2$ combines the two first order beams from $G_1$ to form the reference beam (dashed line $d_4$) as shown in FIG. 4(a). The undiffracted beam from $G_1$ passes straight through $G_2$ to form the sample arm of the interferometer.

It may be noted that fine alignment between the grating vectors can be important in the described scheme for non-trivial phase shifts. The grating vectors alignment can be ensured by observing the interference pattern of the reference beam arriving at mirror $M_4$. As described above, the reference beam (represented by dashed line $d_4$) is comprised of two field components. Without proper alignment of the grating vectors, the interference of the two field components will form fringes at mirror $M_4$. However, by adjusting the grating vector alignment of the grating $G_2$, the fringes can be transformed into a bull's eye pattern—a representative of exact alignment of the grating vectors.

The returning sample beam arrives straight at $G_1$ whereas the reference arm beam reaches $G_1$ through the two possible paths set by the grating $G_2$ and mirrors $M_1$ and $M_2$. The portion of returning reference beam that passes through $G_2$ undiffracted is shown as a dashed line 402 whereas the diffracted component is represented by dashed line 404 [see FIG. 4(b)]. Next, the grating $G_1$ splits and combines the incoming sample and reference beams at ports I, II, and III of the interferometer; the coincident five field components are represented by a dashed line at each output port. FIGS. 4(c)-(h) show the phase of different beams as they undergo diffraction at $G_1$ and $G_2$ during their trip from the input port to the output ports of the modified Michelson interferometer. The total electric field at port I of the harmonically-related grating pair based interferometer can be written as:

$$E_I = \exp\{i2k(d_2 + d_4)\} \times \quad (6)$$
$$[E_{I,1}\exp\{i(\xi_1(x_1) + \pi/2)\} + \quad \rightarrow \text{Field comp. from ref. arm via } M_1, M_4, M_1$$
$$E_{I,2}\exp\{i(-\xi_1(x_1) - \xi_2(x_2) + 2\pi)\} + \quad \rightarrow \text{Field comp. from ref. arm via } M_1, M_4, M_2$$
$$E_{I,3}\exp\{i(-\xi_1(x_1) - \xi_2(x_2) + \pi)\} + \quad \rightarrow \text{Field comp. from ref. arm via } M_2, M_1, M_1$$
$$E_{I,4}\exp\{i(-3\xi_1(x_1) - 2\xi_2(x_2) + \pi/2)\}] + \quad \rightarrow \text{Field comp. from ref. arm via } M_2, M_4, M_2$$
$$E_{I,5}\exp\{i2k(d_1 + d_3)\}\exp\{i(-\xi_1(x_1) + \pi/2)\}. \quad \rightarrow \text{Field comp. from the sample arm}$$

In Eq. (6), the path lengths $d_3$ and $d_4$ are related to the sample and reference arms, respectively. The parameters $E_{I,1}$ to $E_{I,4}$ are the amplitudes of field components from the reference arm whereas $E_{I,5}$ is the amplitude of the field component from the sample arm arriving at port I of the interferometer. Furthermore, $\xi_1(x_1)=2\pi x_1/\Lambda_1$ (as defined earlier) and $\xi_2(x_2)=2\pi x_2/\Lambda_2$. The parameters $x_2$ and $\Lambda_2$ are the displacement and period, respectively, of the second grating $G_2$.

As labeled in Eq. (6), the first four terms represent the field components arriving at the output port I from the reference arm. This is because there are two possible paths (via mirrors $M_1$ and $M_2$) to transit between gratings $G_1$ and $G_2$. The 5th term in Eq. (6) is the field component contributed by the sample arm. It may also be noted that by shearing the grating $G_2$ with respect to $G_1$, the phase of 2nd to 4th reference field components can be adjusted. It is to be noted that if either of the paths (via mirrors $M_1$ and $M_2$) were blocked, only 1st or 4th term will remain (as contribution from the reference arm) that yield trivial phase shifts similar to that in a single grating-based interferometer design.

From Eq. (6), one can express the interference signal at the output port I of the interferometer [shown in FIG. 4(a,b)] as:

$$i_1(x_1,x_2)=2E'(x_1,x_2)E_{I,5}\cos[2k(d_4-d_3+d_2-d_1)+\phi'(x_1,x_2)-2\{\xi_2(x_2)+\xi_1(x_1)\}], \quad (7a)$$

where $$E'(x_1, x_2) = \sqrt{F_1^2(x_1, x_2) + F_2^2(x_1, x_2)}, \quad (7b)$$
$$\phi'(x_1, x_2) = \tan^{-1}\left[\frac{F_2(x_1, x_2)}{F_1(x_1, x_2)}\right]$$

such that $$F_1(x_1,x_2)=E_{I,1}\cos\{4\xi_1(x_1)+2\xi_2(x_2)\}+(E_{I,2}-E_{I,3})\sin\{2\xi_1(x_1)+\xi_2(x_2)\}+E_{I,4} \quad (7c)$$

$$F_2(x_1,x_2)=E_{I,1}\sin\{4\xi_1(x_1)+2\xi_2(x_2)\}-(E_{I,2}+E_{I,3})\cos\{2\xi_1(x_1)+\xi_2(x_2)\}. \quad (7d)$$

Figure 5:
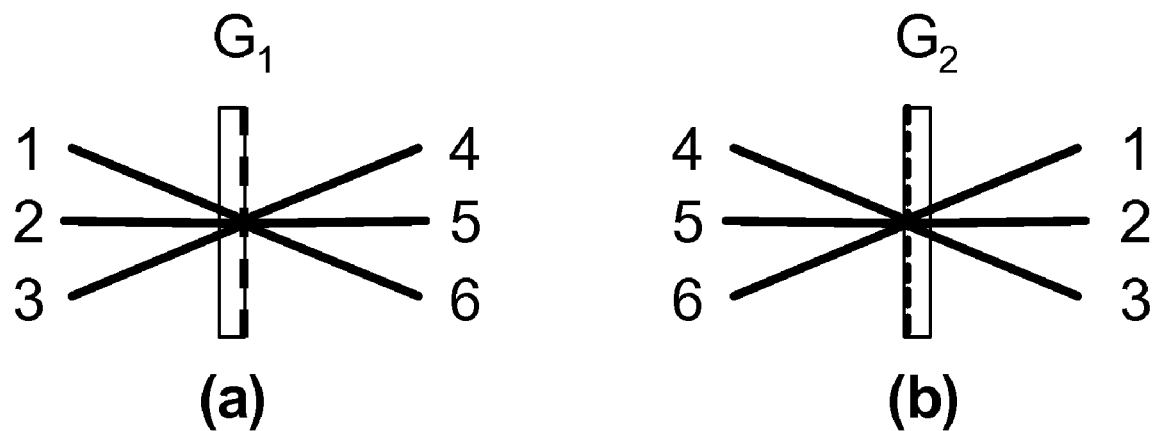
FIG. 5 illustrates a schematic that labels different ports of the gratings $G_1$ and $G_2$ in accordance with one or more embodiments of the invention.

The amplitudes of the field components can be written in terms of diffraction efficiencies of the gratings $G_1$ and $G_2$ as:

$$E_{I,1}=\sqrt{\eta_{1,24}\eta_{2,43}\eta_{2,34}\eta_{1,43}}, \quad (8a)$$
$$E_{I,2}=\sqrt{\eta_{1,24}\eta_{2,43}\eta_{2,36}\eta_{1,63}}, \quad (8b)$$
$$E_{I,3}=\sqrt{\eta_{1,26}\eta_{2,63}\eta_{2,34}\eta_{1,43}}, \quad (8c)$$
$$E_{I,4}=\sqrt{\eta_{1,26}\eta_{2,63}\eta_{2,36}\eta_{1,63}}, \quad (8d)$$
$$E_{I,5}=\sqrt{\eta_{1,25}\eta_{2,52}\eta_{2,25}\eta_{1,53}}, \quad (8e)$$

where $\eta_{i,mn}$ is the diffraction efficiency of ith grating from port m to n (see FIG. 5 illustrating a schematics that labels different ports of the gratings $G_1$ and $G_2$).

Similarly, the interference signal at port II of the interferometer can be expressed as:

$$i_{II}(x_1,x_2)=2E''(x_1,x_2)E_{II,5}\cos[2k(d_4-d_3+d_2-d_1)+\phi''(x_1,x_2)-2\{\xi_2(x_2)+\xi_1(x_1)\}], \quad (9a)$$

where $$E''(x_1, x_2) = \sqrt{F_3^2(x_1, x_2) + F_4^2(x_1, x_2)}, \quad (9b)$$
$$\phi''(x_1, x_2) = \tan^{-1}\left[\frac{F_4(x_1, x_2)}{F_3(x_1, x_2)}\right]$$

such that $$F_3(x_1,x_2)=-E_{II,1}\cos\{4\xi_1(x_1)+2\xi_2(x_2)\}+(E_{II,2}+E_{II,3})\sin\{2\xi_1(x_1)+\xi_2(x_2)\}+E_{II,4}, \quad (9c)$$

$$F_4(x_1,x_2) = -E_{II,1} \sin\{4\xi_1(x_1)+2\xi_2(x_2)\}-(E_{II,2}+E_{II,3}) \cos\{2\xi_1(x_1)+\xi_2(x_2)\}. \quad (9d)$$

In Eqs. (9a)-(9d), $E_{II,1}$ to $E_{II,4}$ represent the amplitudes of field components from the reference arm whereas $E_{II,5}$ is the amplitude of the field component from the sample arm arriving at port II of the interferometer, which are given in terms of diffraction efficiencies of the gratings $G_1$ and $G_2$ as:

$$E_{II,1} = \sqrt{\eta_{1,24}\eta_{2,43}\eta_{2,34}\eta_{1,42}}, \quad (10a)$$

$$E_{II,2} = \sqrt{\eta_{1,24}\eta_{2,43}\eta_{2,36}\eta_{1,62}}, \quad (10b)$$

$$E_{II,3} = \sqrt{\eta_{1,26}\eta_{2,63}\eta_{2,34}\eta_{1,42}}, \quad (10c)$$

$$E_{II,4} = \sqrt{\eta_{1,26}\eta_{2,63}\eta_{2,36}\eta_{1,62}}, \quad (10d)$$

$$E_{II,5} = \sqrt{\eta_{1,25}\eta_{2,52}\eta_{2,25}\eta_{1,52}}. \quad (10e)$$

In a similar fashion, the interference signal at port III of the interferometer is written as:

$$i_{III}(x_1,x_2) = 2E'''(x_1,x_2)E_{III,5}\cos[2k(d_4-d_3+d_2-d_1)+\phi''' (x_1,x_2)-2\{\xi_2(x_2)+\xi_1(x_1)\}+\pi], \quad (11a)$$

where $$E'''(x_1,x_2) = \sqrt{F_5^2(x_1,x_2)+F_6^2(x_1,x_2)}, \quad (11b)$$

$$\phi'''(x_1,x_2) = \tan^{-1}\left[\frac{F_6(x_1,x_2)}{F_5(x_1,x_2)}\right]$$

such that $$F_5(x_1,x_2) = E_{III,1}\cos\{4\xi_1(x_1)+2\xi_2(x_2)\}+(E_{III,2}-E_{III,3}) \sin\{2\xi_1(x_1)+\xi_2(x_2)\}+E_{III,4}, \quad (11c)$$

$$F_6(x_1,x_2) = E_{III,1}\sin\{4\xi_1(x_1)+2\xi_2(x_2)\}+(E_{III,3}-E_{III,2}) \cos\{2\xi_1(x_1)+\xi_2(x_2)\}. \quad (11d)$$

In Eqs. (11a)-(11d), $E_{III,1}$ to $E_{III,4}$ correspond to the amplitudes of field components from the reference arm whereas $E_{III,5}$ denotes the amplitude of the field component from the sample arm arriving at port III of the interferometer. In terms of the diffraction efficiencies of the gratings $G_1$ and $G_2$, the amplitudes of above mentioned field components are given by:

$$E_{III,1} = \sqrt{\eta_{1,24}\eta_{2,43}\eta_{2,34}\eta_{1,41}}, \quad (12a)$$

$$E_{III,2} = \sqrt{\eta_{1,24}\eta_{2,43}\eta_{2,36}\eta_{1,61}}, \quad (12b)$$

$$E_{III,3} = \sqrt{\eta_{1,26}\eta_{2,63}\eta_{2,34}\eta_{1,41}}, \quad (12c)$$

$$E_{III,4} = \sqrt{\eta_{1,26}\eta_{2,63}\eta_{2,36}\eta_{1,61}}, \quad (12d)$$

$$E_{III,5} = \sqrt{\eta_{1,25}\eta_{2,52}\eta_{2,25}\eta_{1,51}}. \quad (12e)$$

It can be seen from Eqs. (7)-(12) that the amplitude and phase of the interference signals at the three ports I, II, and III not only depend on the strength of individual field components taking part in the interference but also on the additional phase shifts from gratings $G_1$ and $G_2$.

For clarity, one may more closely examine the interference signals, given by Eqs. (7a), (9a) and (11a), at the three output ports. It can be seen that the non-trivial phase term $2[\xi_2(x_2)+\xi_1(x_1)]$ is mutual to all the three interference terms. It, therefore, yields a trivial phase shift between different output ports. The non-trivial phase terms in Eqs. (7a), (9a) and (11a), which play a role in providing a non-trivial phase shift between the output ports, are $\phi'(x_1,x_2)$, $\phi''(x_1,x_2)$, and $\phi'''(x_1,x_2)$, respectively. It is to be noted that these phase terms do not depend on the path lengths and can be solely adjusted by shearing of the harmonically-related gratings.

The only phase term that involves the path lengths $d_i$, i=1, 2, 3, 4 is $2k(d_4-d_3+d_2-d_1)$, and is common to all the three interference signals. As such, it yields only a trivial phase between different output ports. This also illustrates that in the described scheme, the shearing of the gratings to achieve non-trivial phase does not change the path length relationship between the interference beams at the output ports of the modified Michelson interferometer.

For experimental verification, one can realize a setup shown in FIG. 4(a,b). A collimated beam ($1/e^2$ diameter ≈1 mm) from a 633 nm HeNe laser was used in the experiment. As described, $G_1$ was chosen to be the same as that used in the setup shown in FIG. 2(a) whereas $G_2$—the second harmonic grating was selected as 1200 grooves/mm blazed transmission grating (Thorlabs, Inc., GT25-12). The path length $d_1$ between the gratings $G_1$ and $G_2$ was ~20 cm. The reference mirror $M_4$ was mounted on a voice coil to modulate the reference arm. The grating $G_2$ was translated along the x-direction using a piezo actuator (25.5 nm/V) and heterodyne interference signals were acquired at the three output ports using the same photodetectors as described above.

Table 1 illustrates measured efficiencies of the gratings used in the setup shown in FIG. 4(a,b). These diffraction efficiencies were used to determine the theoretical phase shifts between different output ports of the modified Michelson interferometer.

TABLE 1

| 600 grooves/mm | | | | 1200 grooves/mm | | | |
|---|---|---|---|---|---|---|---|
| $\eta_{1,14}$ | 0.001 | $\eta_{1,41}$ | 0.001 | $\eta_{2,14}$ | 0.12 | $\eta_{2,41}$ | 0.11 |
| $\eta_{1,15}$ | 0.43 | $\eta_{1,51}$ | 0.43 | | | | |
| $\eta_{1,16}$ | 0.28 | $\eta_{1,61}$ | 0.28 | $\eta_{2,16}$ | 0.75 | $\eta_{2,61}$ | 0.73 |
| $\eta_{1,24}$ | 0.44 | $\eta_{1,42}$ | 0.42 | | | | |
| $\eta_{1,25}$ | 0.23 | $\eta_{1,52}$ | 0.24 | $\eta_{2,25}$ | 0.67 | $\eta_{2,52}$ | 0.67 |
| $\eta_{1,26}$ | 0.11 | $\eta_{1,62}$ | 0.11 | | | | |
| $\eta_{1,34}$ | 0.14 | $\eta_{1,43}$ | 0.19 | $\eta_{2,34}$ | 0.70 | $\eta_{2,43}$ | 0.69 |
| $\eta_{1,35}$ | 0.10 | $\eta_{1,53}$ | 0.13 | | | | |
| $\eta_{1,36}$ | 0.05 | $\eta_{1,63}$ | 0.06 | $\eta_{2,36}$ | 0.10 | $\eta_{2,63}$ | 0.11 |

$\eta_{i,mn}$: Diffraction efficiency of $i^{th}$ grating from port m to port n.

Figure 6A:
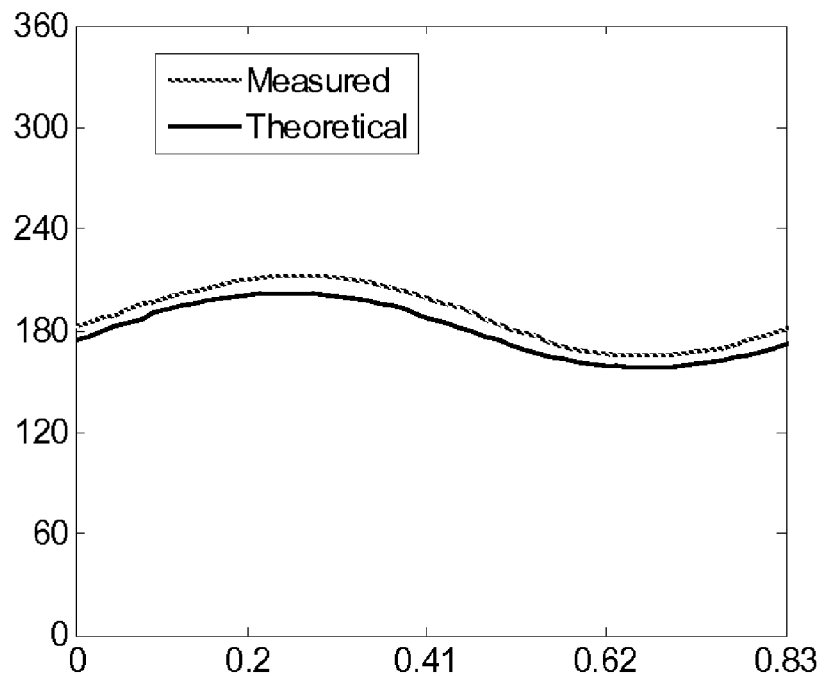
FIG. 6 illustrates measured phase shifts between (a) ports I & II and (b) ports I & III of a harmonically-related gratings based modified Michelson interferometer versus shearing of grating $G_2$ with respect to $G_1$ in accordance with one or more embodiments of the invention.
Figure 6B:
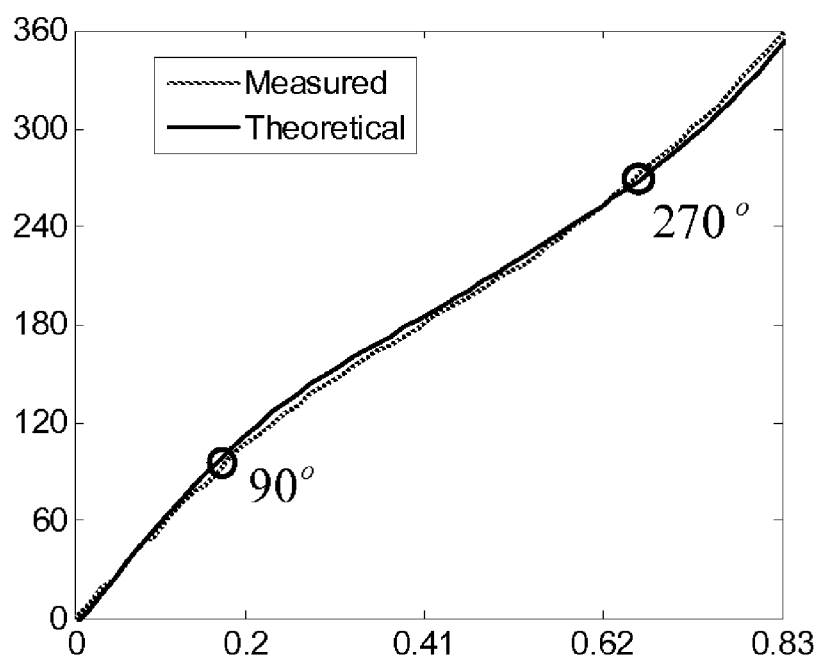

FIG. 6 illustrates measured phase shifts between (a) ports I & II and (b) ports I & III of a harmonically-related gratings based modified Michelson interferometer versus shearing of grating $G_2$ with respect to $G_1$. The locations where phase difference between port I and III are equal 90° and 270° are labeled.

More specifically, FIG. 6 shows both the measured as well as the theoretical phase differences between output ports of the interferometer versus shearing of grating $G_2$ up to one grating periods. Table 1 shows measured diffraction efficiencies of gratings $G_1$ and $G_2$ (used in the setup) to calculate theoretical phase shifts between different ports of the interferometer. It can be seen that phase shift between ports I and III changes almost in a linear fashion as the grating G2 is sheared along the $x_2$ direction. This ability to achieve non-trivial phase shifts illustrates the possibility to design gratings-based interferometer for full-field quadrature phase interferometry. This experiment does require gratings that are uniform and harmonically-related over the area of the incident beams. Based on the goodness-of-fit of the measurements, the gratings do appear to be well behaved over the area of the beams in the experiment.

In view of the above, and in a proof-of-concept experiment, the description above, uses 600 grooves/mm and 1200 grooves/mm shallow diffraction gratings to demonstrate the phase shift control between various ports of the modified Michelson interferometer. The experimental data is in good agreement with the theoretical results calculated for a harmonically-related gratings-based interferometer scheme.

Another permutation for harmonically-related grating-based Michelson interferometer is to use the port 1 (instead of port 2) of the grating $G_2$ (see FIG. 5) to realize the sample arm. However, such a design generates a total of eight field components (four from sample arm and another four from the reference arm) at each output port of the interferometer. Here, an interesting question arises as to whether one can also use two similar gratings (e.g., a $G_1G_1$ combination as opposed the $G_1G_2$ combination) in the design shown in FIG. 4(*a,b*). In one or more embodiments, two similar gratings may be used to control phase shift between different output ports. However, such a design yields twelve field components (six each from the reference and sample arms) at each output port. It is to be noted that the complexity of similar gratings-based interferometer design can be reduced if one of the mirrors, i.e., $M_1$ or $M_2$ is removed. This will reduce the total number of field components at each output port to eight. Nonetheless, the harmonically-related gratings-based modified Michelson interferometer described above yields only a total of five field components at each output port and may provide us the simplest gratings-based quadrature phase interferometric design.

It may also be noted that an additional advantage of using harmonically-related gratings (as opposed to similar gratings) is that they can also be fabricated or holographically recorded on a single substrate, making it possible to design compact imaging systems for full-field quadrature interferometry. Finally, the concepts of harmonically-related gratings-based interferometer may be easily translated to X-rays as well, making it possible to realize X-ray systems for quadrature phase measurements.

Quadrature Free-Space Phase Interferometer

As described earlier, a single shallow diffraction grating can be used to create a multiport ($n \geq 3$) interferometer. However, the outputs of such an interferometer are trivially related in phase. Further, as previously described, harmonically-related gratings can be utilized to realize a modified Michelson quadrature phase interferometer. Moreover, the phase shift between different interference signals at different ports can be adjusted by shearing the two gratings G1 and G2 with respect to each other.

Figure 7:
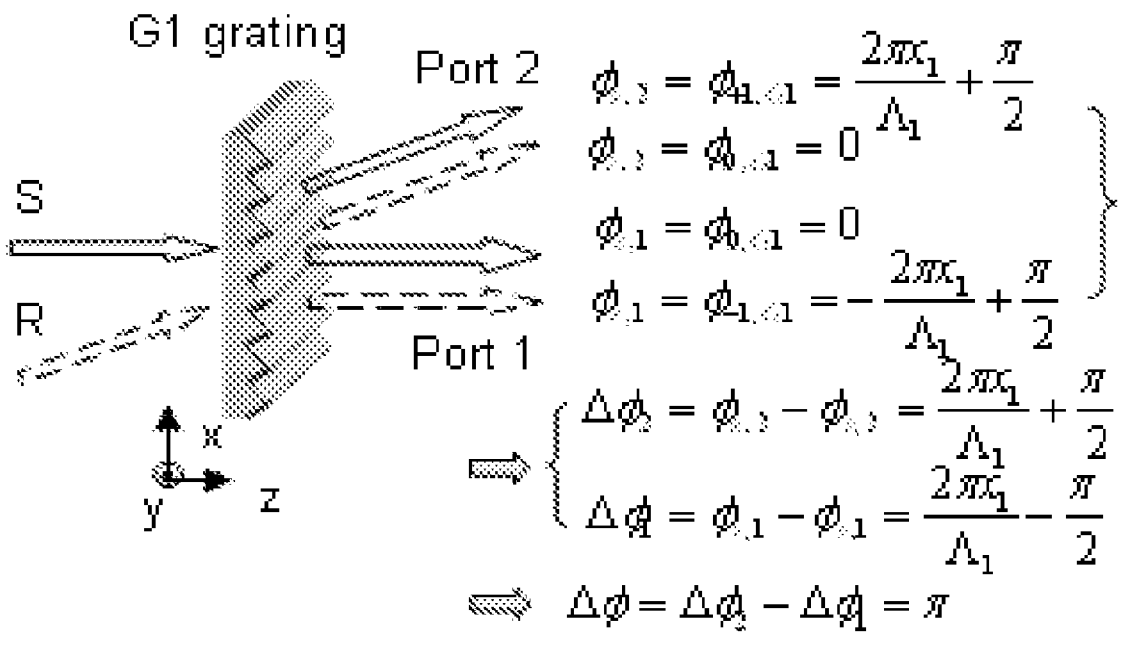
FIG. 7 illustrates the ability to achieve non-trivial phase shift in an interferometer by using a G1G2 grating as a beam combiner in accordance with one or more embodiments of the invention.
Figure 7:
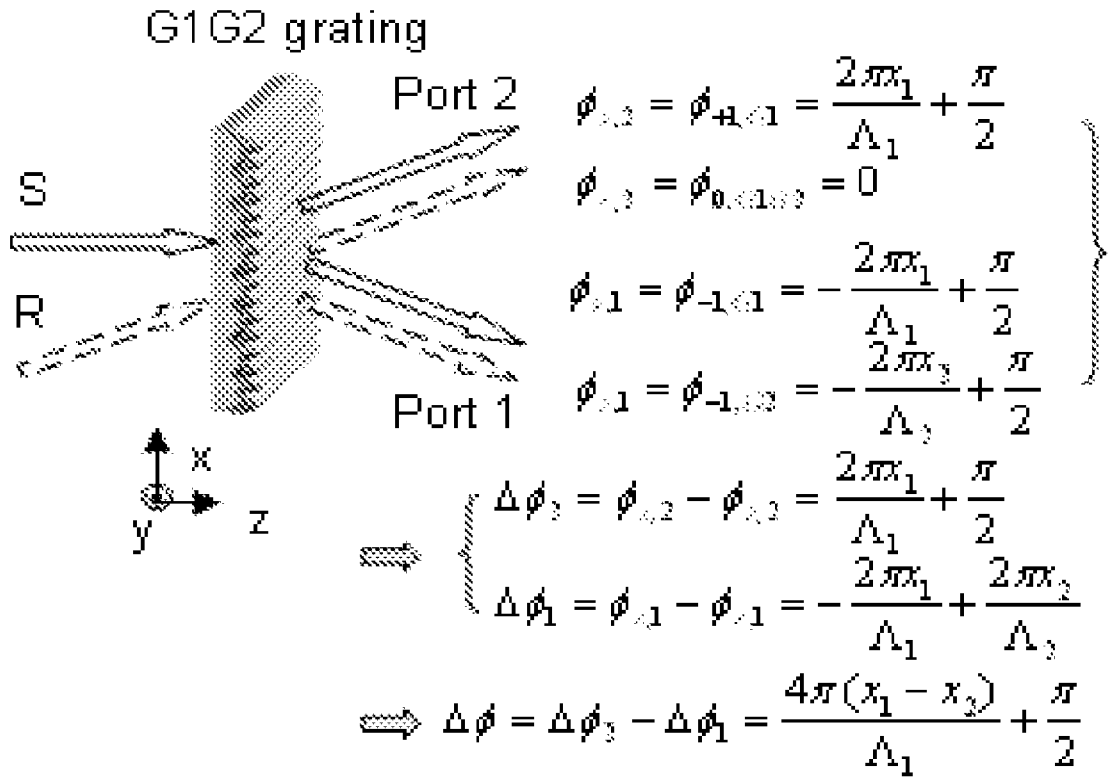

In addition, the two harmonically-related gratings G1 and G2 can be recorded on a single holographic (or a photosensitive) plate. The shearing between gratings G1 and G2 can be adjusted by controlling the phase of the different light beams during the recording process. The resulting single optical element G1G2 can be used as a beam splitter/combiner in a modified Mach-Zehnder interferometer. The non-trivial phase between outputs of such a G1G2 interferometer is due to the interference between diffractions from the two gratings. To better explain this, the phase of each diffracted order and interference term for a single grating interferometer and a G1G2 interferometer is listed in FIG. 7. Accordingly, FIG. 7 illustrates the ability to achieve non-trivial phase shift in an interferometer by using a G1G2 grating as a beam combiner. In FIG. 7(*a*), the interference outputs of a single grating based interferometer can only possess a π phase difference. In FIG. 7(*b*), a combined harmonically related grating illustrates the introduction of non-trivial phase shift between the interference outputs.

In FIG. 7, G1, G2 are gratings recorded on the same photosensitive plate. The periods $\Lambda_1$, $\Lambda_2$ of the two gratings satisfy the condition $\Lambda_2 = 2\Lambda_1$. $x_1$ and $x_2$ are the displacements of the gratings G1, G2 with respect to the origin, respectively; $\phi_{m,Gn}$ is the phase shift of the $m^{th}$ diffracted order from the grating Gn (n=1,2); $\phi_{k,n}$ is the phase shift of the diffracted reference (k=R) or sample beam (k=S) exiting port n; $\Delta\phi_n$ (n=1,2) is the resulting interference phase shift at port n; finally, $\Delta\phi$ is the phase difference between the two ports. The phase shift of the $m^{th}$ diffracted order from a shallow grating is given by Eq. (3)

FIG. 7(*a*) shows that a single grating interferometer can only give rise to a trivial phase shift between the outputs; though, the phase shift $\phi(x_0)$ is present in the diffracted beams, this $x_0$ dependency does not manifest in the interference phase difference between the two outputs. In contrast, the outputs' phase difference in the G1G2 interferometer depends on the gratings' relative displacement $(x_1-x_2)$—a quantity that can be adjusted in the G1G2 fabrication process. It may be noted that, while only two port are used in the G1G2 interferometer, the interferometer is actually a multiport system (n>=3) when higher diffraction orders are considered. It may be further noted that as long as G1 and G2 are exactly harmonically matched, the interference phase difference $\Delta\phi$ will be the same for ray pairs incident at any point on the G1G2 grating—an important consideration for full field phase imaging.

In the regime where $P_r$ is much stronger than $P_s$, the detected powers at the output ports can be written as:

$$P_1 \approx P_{r1} + 2\sqrt{P_{r1}P_{s1}}\cos(\Delta\psi) \quad (6)$$

$$P_2 \approx P_{r2} + 2\sqrt{\eta}\sqrt{P_{r2}P_{s1}}\cos(\Delta\psi+\Delta\phi) \quad (7)$$

where $P_{r1}$ and $P_{r2}$ are the detected reference powers in the output ports 1 and 2, respectively; $P_{s1}$ is the detected sample power in the output port 1; $\eta = \eta_{|1,G1|}/\eta_{1,G1}$, with $\eta_{m,Gn}$ denoting the efficiency of the $m^{th}$ diffraction from grating $G_n$ (n=1, 2); $\Delta\psi = \psi_s - \psi_r$ is the optical phase difference between the sample and reference beam.

From Eq. (6) and (7), the phase and amplitude of the sample (relative to the reference) beam can be obtained:

$$\Delta\psi = \tan^{-1}\frac{s_1\cos\Delta\phi - s_2}{s_1\sin\Delta\phi}, \quad P_{s1} = \left(\frac{s_1}{\cos(\Delta\psi)}\right)^2 \quad (8)$$

$$\text{where } s_1 = \frac{P_1 - P_{r1}}{2\sqrt{P_{r1}}}, \quad s_2 = \frac{P_2 - P_{r2}}{2\eta\sqrt{P_{r2}}}.$$

Experimentally, the G1G2 grating can be created by the following process. An expanded HeNe laser of power 2.7 μW and diameter 18 mm was split into three beams. The beams can then be arranged to intersect at the same spatial point such that the three beams lie in the same plane and the center beam bisects the other two. The alignment of the beams can be achieved by placing a standard 600 lines/mm grating at the point of overlap and verifying that the diffraction from the three beams overlaps and forms bull's eye patterns. The grating is then replaced with a PFG-01 holographic plate. Upon sufficient light exposure (~105 s) and subsequent processing, a G1G2 grating can be obtained.

Figure 8:
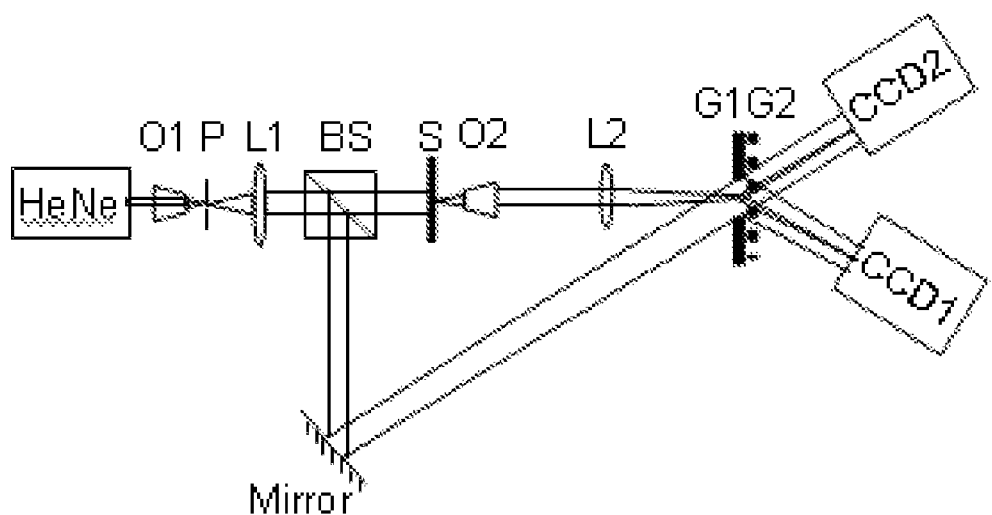
FIG. 8 illustrates an experimental setup for phase imaging in accordance with one or more embodiments of the invention.

The grating's intrinsic interference phase difference $\Delta\phi$ was measured by sending a narrow reference and sample beam (diameter ~1 mm) through the plate in the geometry shown in FIG. 8. Thus, FIG. 8 illustrates an experimental setup for phase imaging. O1, 2: objective lens 1, 2; P, pinhole; L1, 2: lens 1, 2; BS: beam splitter; S: sample; G1G2: the G1G2 harmonic grating pair on a holographic plate. The uniformity of the phase difference across the plate's surface was verified by repeating the measurement at different points on the plate. Measurements indicate good uniformity and a Δφ value of 75°±10°.

A modified Mach-Zehnder G1G2 interferometer for full field phase imaging can be constructed in accordance with FIG. 8. The laser HeNe 200 was focused by objective 1 (O1) (Swift 10X) and a pinhole (P) (diameter 25 μm) served as a spatial filter. The filtered laser beam was then collimated by lens 1 (L1) (focal length 200 mm) and split by the 5/95 beam splitter (BS). In the sample arm, the objective lens 2 (O2) (Newport M-10X) and lens 2 (L2) (focal length 200 mm) made up a microscope system that imaged the sample onto two CCD cameras (CCD 1 and CCD2). The harmonic gratings pair (G1G2) served as the beam combiner/splitter. The maximum light intensity incident on the sample was 32.6 W/m$^2$ and the light intensity of reference beam incident on the grating was 1.7 W/m$^2$. A measurement of $\eta_{+1,G1}$=16%, $\eta_{-1,G1}$=5% and $\eta_{-1,G2}$=9% can also be obtained. During imaging, P1 and P2 associated with each point on the image plane can also be measured.

Figure 9:
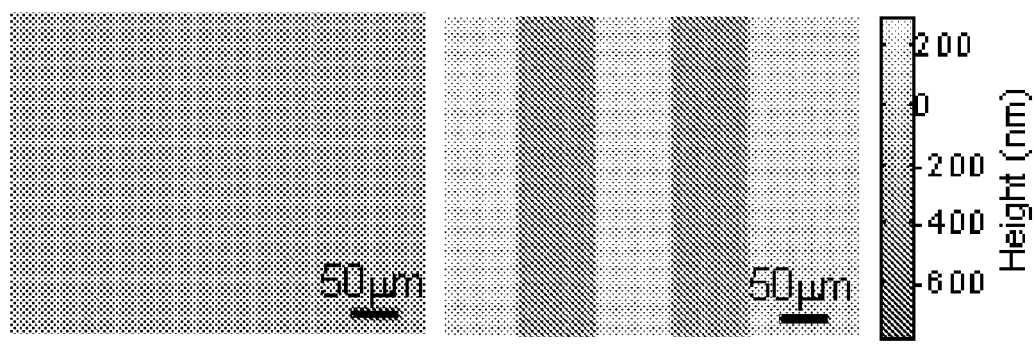
FIG. 9 illustrates a phase image of double bars fabricated on an ITO glass in accordance with one or more embodiments of the invention.
Figure 9:
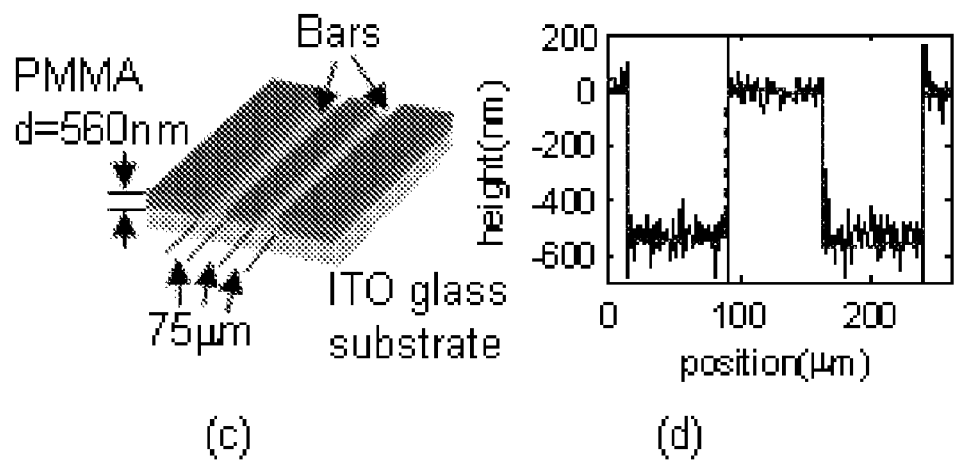

The system described herein can be used to image a phase object. The object consists of two bars of PMMA material (polymethyl methacrylate) (width 75 μm, separation 75 μm and height ~560 nm) on a glass plate, as shown in FIG. 9(c) (PMMA's refractive index (r.i.) is 1.496). The acquired intensity and phase image are shown in FIGS. 9(a) and 9(b). In this regard FIG. 9 illustrates a phase image of double bars fabricated on an ITO glass with a thickness of 560 nm. (a) Intensity image; (b) Phase image; (c) Schematic of the phase object; (d) Quantitative phase value compared with the profilometry result.

It can be seen that the intensity image (FIG. 9(a)) shows little contrast. On the other hand, the features of the objects show up well in the phase image (FIG. 9(b)). Quantitative measurement of the PMMA thickness (~540 nm) is shown in FIG. 9(d), agreeing well with the profilometry measurement (~555 nm). The standard deviation of the data shown in FIG. 9(d) is ~33 nm, which corresponds to a phase error of ~9.3°.

Figure 10:
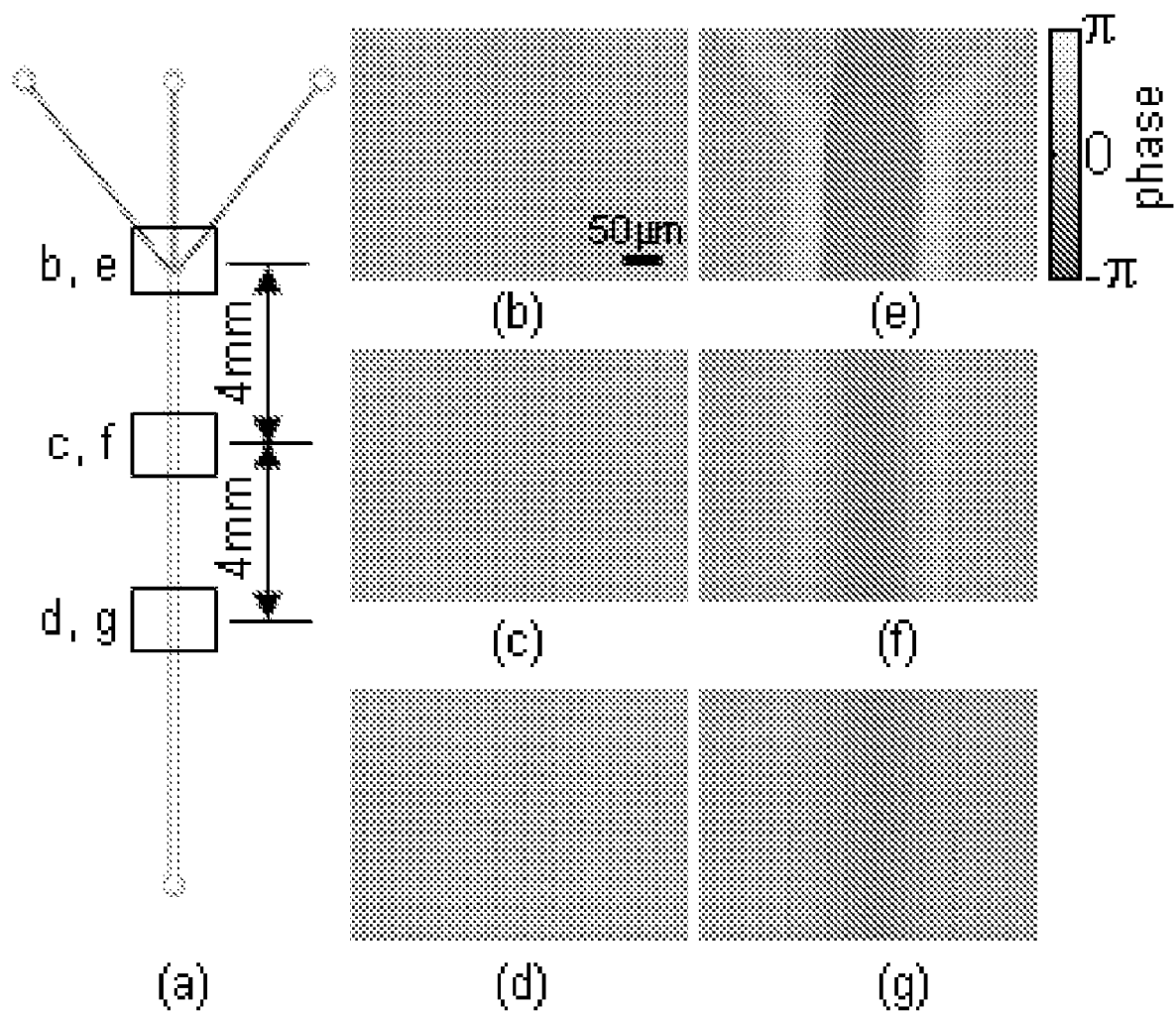
FIG. 10 illustrates the observing of the diffusion process in a microfluidic channel in accordance with one or more embodiments of the invention.

The phase imaging system may also be used to observe liquid diffusion in a microfluidic channel (see FIG. 10). FIG. 10 illustrates the observing of the diffusion process in a microfluidic channel. FIG. 10(a) illustrates fluid mixing in a microfluidic channel (salt water in the middle and water on either side). The location of acquired images illustrated in FIGS. 10(b)-10(g) is indicated in FIG. 10(a). FIGS. 10(b)-10(d) illustrate intensity images that are acquired in three different locations as indicated in FIG. 10(a). FIGS. 10(e)-10(g) illustrate corresponding phase images of FIGS. 10(b)-10(d).

A study of fluidic interfaces in microfluidic channels is important for numerous applications [B6]. Micromixing is usually observed by fluorescence techniques or through the use of dyes. The techniques are indirect as it is the movements of fluorophores or dye molecules rather than the actual fluid molecules that are observed. Phase imaging techniques enable the direct observation of the fluid mixing if the fluids involved have different refractive indices (r.i.). FIG. 10(a) shows the fabricated microfluidic channel for observing the mixing of three fluid streams. In an experiment, a NaCl solution may be pumped (weight percentage=30%, r.i.=1.393) into the middle inlet of the channel and two streams of deionized water can be pumped (r.i.=1.333) into the two side inlets. The flow speed may be 1 mm/min inside the microfluidic channel. Phase (FIGS. 10(e)-10(g)) and intensity (FIGS. 10(b)-(d)) images may be acquired in the junction region and two downstream locations as indicated in FIG. 10(a). Once again, the intensity images show little contrast while the phase images clearly show the diffusion of the fluids in the channel. Such an experiment demonstrates the utility of the invention's phase imaging technique to study fluid mixing in microfluidic systems.

Optical Coherence Tomography System

As described above, embodiments of the invention provide the ability to obtain non-trivial phase shifts (other than 0 or 180 deg) between the output ports of reflectance-based interferometers along with its use in low coherence interferometric applications. As described above, in a single-grating based interferometer (shown in FIG. 2), a non-trivial phase shift is conferred on the interference term associated with each output port. However, since the phase shift is conferred equally for each output port, a single-grating based interferometer does not yield an observable non-trivial phase difference between the output ports I, II and III.

However, such an effect does not extend to interferometers that contain two or more shallow gratings (see above). Specifically, two harmonically-related shallow diffraction gratings can be used to realize a modified Michelson interferometer (see FIG. 4) where the phase difference between output ports can be adjusted by simply shearing (along x-axis) the two gratings with respect to each other—a free-space equivalent of a 3×3 fiber-optic coupler [C25].

Shear translation of the gratings relative to each other does not change the path length relationships of the different optical paths within the interferometer—an advantage for metrology and low coherence interferometry applications. An additional advantage of using harmonically-related gratings is that they can also be fabricated or holographically recorded on a single substrate, making it possible to design compact systems for quadrature phase interferometric applications.

In view of the above, embodiments of the invention may also provide a full-range point-field and line-field OCT systems based on the harmonically-related gratings G1 and G2, recorded/fabricated on a same substrate. The harmonically-related gratings G1 and G2 can also be recorded on separate substrates and subsequently put together (sandwiched) to form the 3×3 optical elements for quadrature phase applications.

Spectrometer-Based Full-Range Point-Field OCT

Figure 11:
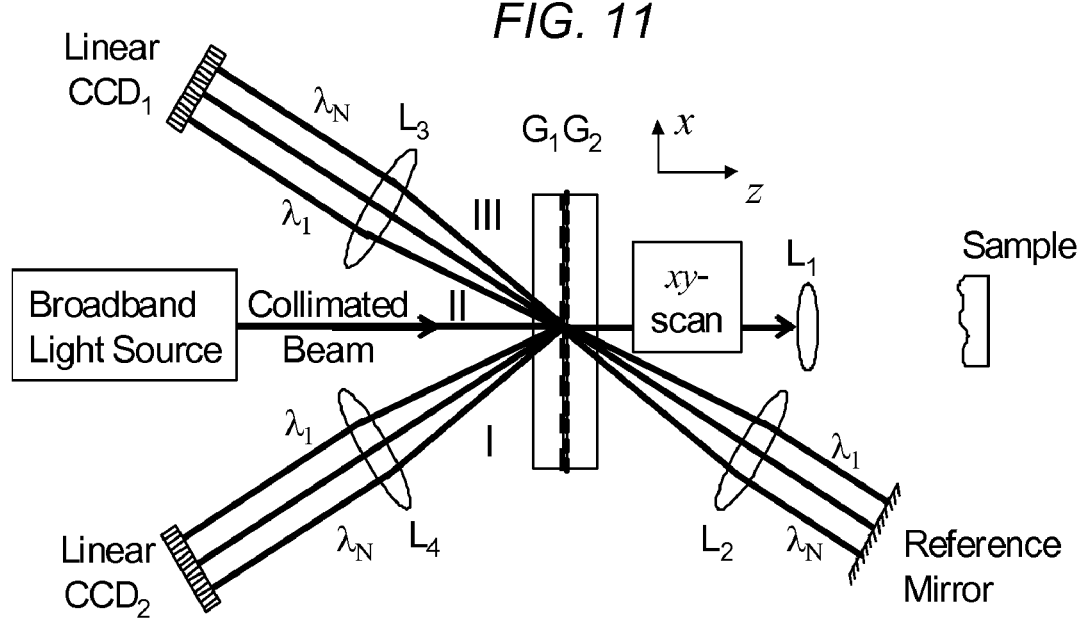
FIG. 11 shows the schematic of a spectrometer-based full-range point-field OCT system based on harmonically-related gratings $G_1$ and $G_2$ in accordance with one or more embodiments of the invention.

FIG. 11 shows the schematic of a spectrometer-based full-range point-field OCT system based on harmonically-related gratings $G_1$ and $G_2$ in accordance with one or more embodiments of the invention. As illustrated in FIG. 11, CCD is a charged-coupled device and $L_i$ is the $i^{th}$ spherical lens. While recording the gratings, the shearing between the gratings G1 and G2 is controlled in such a manner that the output ports I and III (see FIG. 11) are preferably π/2 phase shifted with respect to each other. A π/2 phase shift between the output ports I and III may be utilized. However, additional processing can be used to correct non-quadrature phase shifts, or variation in phase shift as a function of wavelength [C22-C24].

In FIG. 11, a collimated beam from a broadband source reaches the $G_1G_2$ grating pair, where it is split into a sample and reference beams. A spherical lens $L_1$ is used to focus the incident beam as well as to collect the back scattered light from the sample. A spherical lens $L_2$ collects the wavelength-dependent angularly dispersed reference light. The collected light focuses on the reference mirror and follows the same path to the $G_1G_2$ grating pair. The returning sample and reference light undergoes a second diffraction at the grating pair, where the two beams are split and combined at the output ports I, II, and III of the interferometer.

Notice that one may only be interested in ports I and III (which are π/2 phase shifted with respect to each other). Two similar spherical lenses $L_3$ and $L_4$ are used to collect and focus the light onto linear CCD arrays 1 and 2, respectively. Since the gratings $G_1$ and $G_2$ are harmonically-related, the angular spread of the light at ports I and III will be the same.

In view of the above, the use of a harmonically-related grating pair not only provides quadrature signals simultaneously but also facilitates construction of two identical spectrometers used for acquisition of $\pi/2$ phase shifted interferograms. The two quadrature interferograms can be therefore processed to determine a full-range depth-scan (or A-scan). An xy-scanner is used for lateral scanning for three-dimensional (3-D) imaging of the sample [C26-C27]. Since the reference arm is already spectrally dispersed, minimal additional components can be introduced for dispersion compensation through rapid scanning optical delay line (RSOD) type configurations [C28-C29].

Full-Range Swept-Source Line-Field OCT

Figure 12:
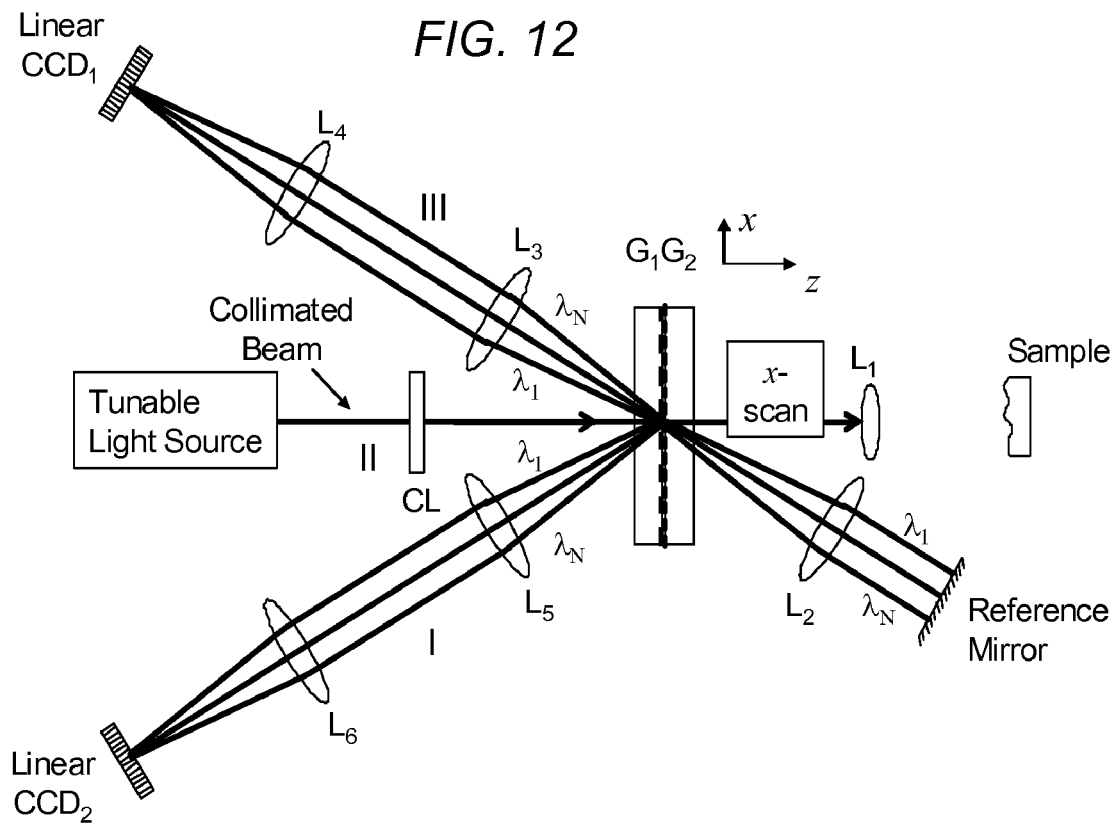
FIG. 12 shows the schematic of a full-range line-field swept source OCT system based on a harmonically-related grating pair $G_1G_2$ in accordance with one or more embodiments of the invention.

FIG. 12 shows the schematic of a full-range line-field swept source OCT system based on a harmonically-related grating pair $G_1G_2$ in accordance with one or more embodiments of the invention. As illustrated, the CCD is a Charged-coupled device, CL is a Cylindrical lens, and Li is the ith spherical lens. A collimated beam from a tunable laser source passes through a cylindrical lens (CL) which along with a spherical lens $L_1$ focuses the incident beam along the y-direction for line-field illumination on the sample. The angularly dispersed reference light is collected by a spherical lens $L_2$ and reflected by the reference mirror. The returning sample and reference light reaches the grating pair to undergo a second diffraction, where the two beams are split and combined at the output ports I and III of the interferometer.

Identical pairs of spherical lenses are employed at each output port I and III. Since line-field illumination has been used on the sample, the 4f imaging systems at the two output ports will line-focus the light in the xz-plane (see FIG. 12). Identical linear CCD arrays (aligned along the output line-field distribution) are then used to measure the quadrature signals at the two output ports. The optical source is tuned to generate a set of discrete wavelengths and corresponding sets of quadrature signals are recorded simultaneously for all spatial points in the line field illumination. The two sets of quadrature signals form $\pi/2$ phase shifted interferograms, which correspond to a B-scan of the sample. The quadrature signals can be further processed for full-range probing into the sample. Linear scanning along the x-direction is employed to obtain a set of quadrature B-scans of the sample and subsequently processed to construct full-range 3-D imaging.

A free-space optical circulator can be introduced at port II between the CL and the grating pair. A similar 4f imaging system—linear CCD arrangement (as shown in the other two ports) can be used to record non-trivially shifted spectral interferogram at port II. This additional information can be used in signal processing such as for DC removal or complex signal reconstruction.

Spectrometer-Based Full-Range Line-Field OCT

Figure 13:
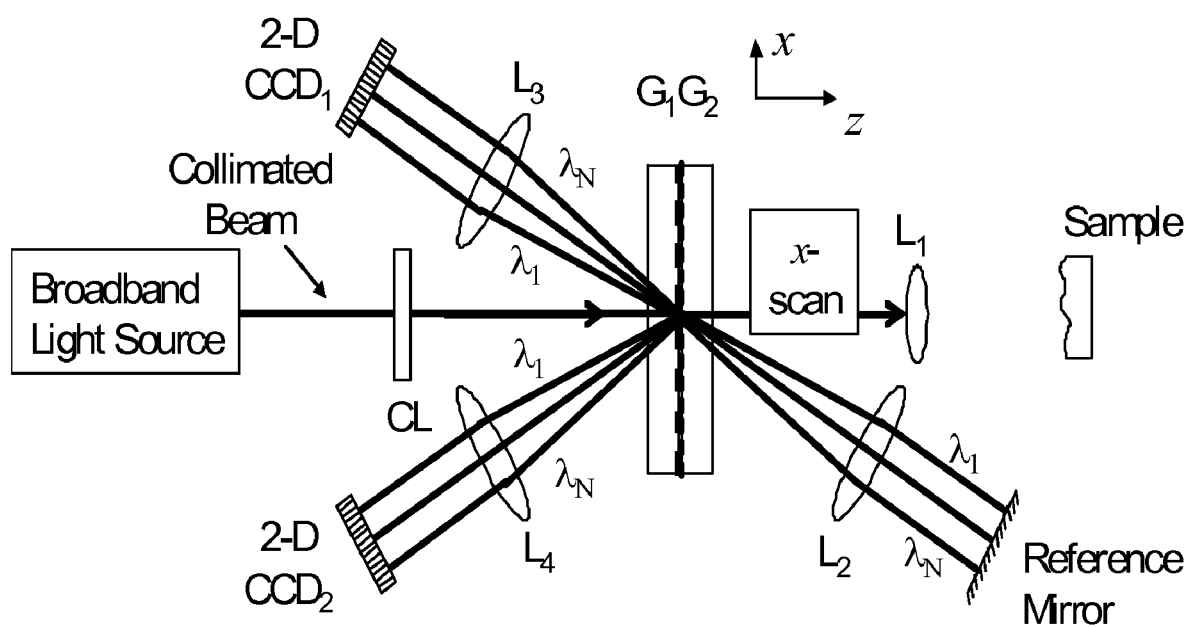
FIG. 13 shows the schematic of a spectrometer-based full-range line-field OCT system in accordance with one or more embodiments of the invention.

The schematic of a spectrometer-based full-range line-field OCT system is shown in FIG. 13 in accordance with one or more embodiments of the invention. As in the previous designs, the full-range OCT system requires acquisition of complex signal and therefore makes use of $G_1G_2$ grating pair with $\pi/2$ phase shifted output ports.

The system design is similar to that shown in FIG. 11 except that it is line-field (instead of point field) illumination on the sample and the spectrometers built in the two $\pi/2$ phase shifted output ports, i.e., I and III, are 2-D spectrometers (instead of 1-D). The line-field illumination on the sample is achieved in a similar fashion as described for the system in FIG. 12. Two-dimensional CCDs are used to acquire quadrature signals, with the spectral dispersion of the beam oriented perpendicular to linear position on the illuminating line-field. Each acquired frame of the CCD thus corresponds to an entire B-scan of the sample. These quadrature signals can be further processed to achieve full-range probing into the sample. For full range 3-D imaging, linear scanning along the x-direction is employed to obtain sets of quadrature B-scans of the sample.

Logical Flow

Figure 14:
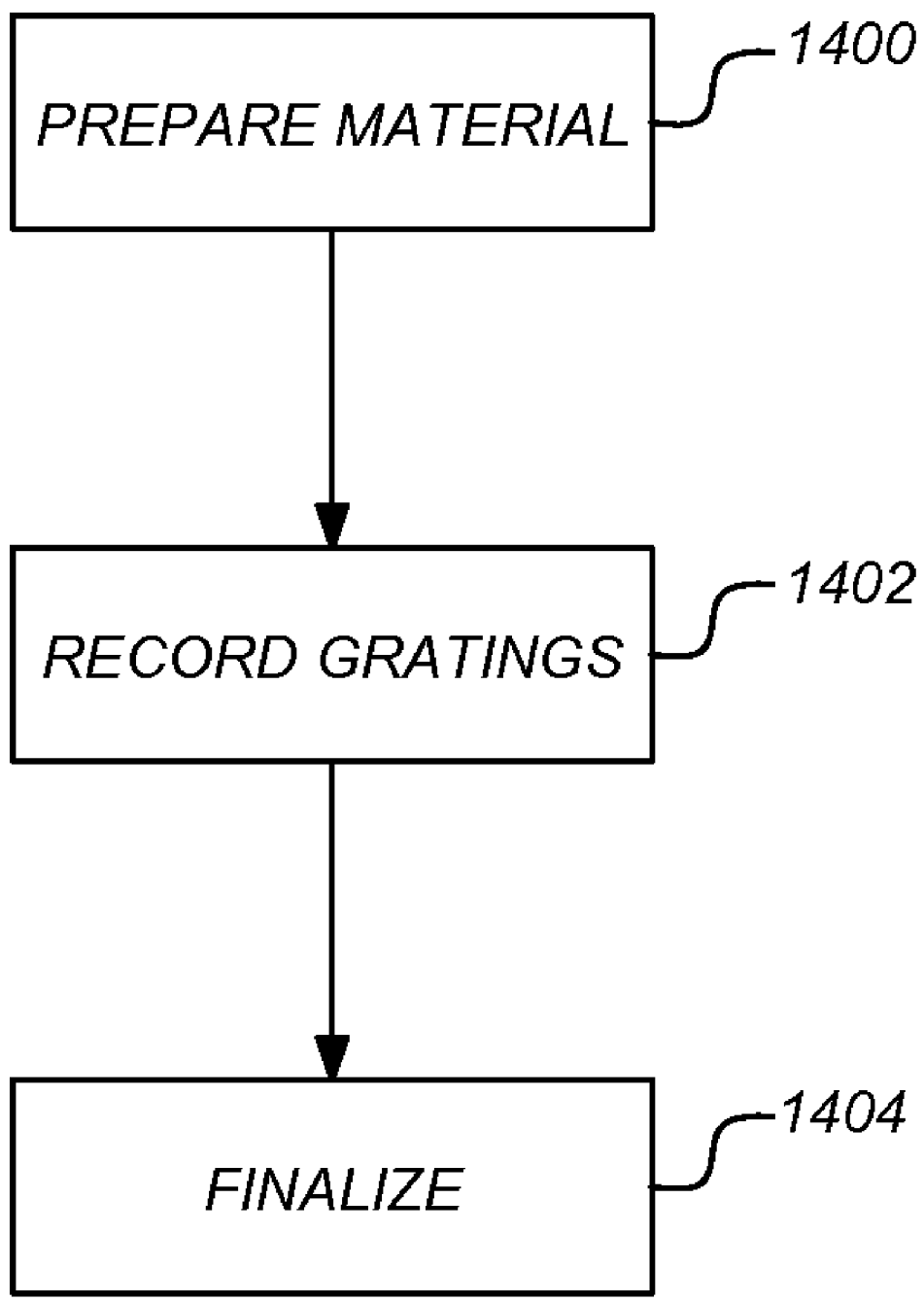
FIG. 14 illustrates the logical flow for fabricating a beam splitter/combiner used for acquiring phase measurements in accordance with one more embodiments of the invention.

FIG. 14 illustrates the logical flow for fabricating a beam splitter/combiner used for acquiring phase measurements in accordance with one more embodiments of the invention.

At step 1400, a substrate material is prepared. Such a preparation may include the preparation of suitable laser (such as a HeNe laser) of a particular power and diameter. Such preparation further includes the arrangement of beams from the laser to intersect at a particular spatial point. The preparation may further include the preparation of a holographic plate At step 1402, the gratings are recorded on the substrate (e.g., holographically on a single substrate). Such a process yields simultaneous recording of both the gratings G1 and G2 on the substrate (e.g., the holographic plate). The angular displacements among the three recording beams are adjusted such that the two gratings are harmonically-related and aligned, i.e., the grating planes and grating vectors of the first and second grating are parallel to that of each other. In addition, the relative phase of the recording beams is adjusted for controlled shearing between the recorded harmonically-related gratings. Further, due to the relative shearing of the recorded gratings, the resulting phase shift between different ports of the modified planar beam/splitter combiner is non-trivial.

At step 1404, the recorded gratings are finalized on the material. Such a finalization step may further include utilizing of the resulting beam splitter/combiner in an interferometer (e.g,. a Michelson or Mach-Zehnder interferometer). In a Michelson interferometer or Mach-Zehnder interferometer, the beam/splitter combiner is used to produce interference signals at three ports of the interferometer, wherein the phase shift between at least two of the three ports is non-trivial. The introduction of the resulting beam splitter/combiner in a Michelson interferometer enables full field phase imaging of a reflective phase object.

The placement of the resulting beam splitter/combiner in a Mach-Zehnder interferometer enables full field phase imaging of transmissive a phase object. In such an embodiment, a lens L1 is configured to collimate a filtered laser beam and a pair of lenses create a microscope system that images the phase object onto two CCD (charge coupled device) camera. Such a phase object may be two bars of PMMA material on a glass plate or a microfluidic channel where the interferometer is used to observe liquid diffusion in the channel. Alternatively, the phase object may also be a biological sample such red blood cells, etc.

The beam splitter/combiner may also be used in a spectrometer based full range point-field as well as line-field OCT systems. In a point-field full range OCT system, the beam splitter/combiner is used to split a collimated beam into a sample and reference beam. A spherical lens L1 focuses an incident light beam and collects back scattered light from a sample. A spherical lens L2 collects angularly dispersed reference light. The back scattered light and the reference light undergo a diffraction at the beam splitter/combiner where the back scattered light and the reference light are split and combined at output ports. Lastly, lenses L3 and L4 collect and focus light from the output ports onto linear CCD arrays.

CONCLUSION

This concludes the description of the preferred embodiment of the invention. Alternate embodiments may also be used to accomplish the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[A1] J. C. Shaw, "Metrology using differential phase-contrast microscopy," Microelectron. Eng. 13, 527-530 (1991);

[A2] P. J. McMahon, E. D. Barone-Nugent, B. E. Allman, and K. A. Nugent, "Quantitative phase-amplitude microscopy II: differential interference contrast imaging for biological TEM," J. of Microsc.-Oxford 206, 204-208 (2002);

[A3] F. Zernike, "Phase contrast, a new method for the microsopic observation of transparent objects," Physica 9, 686-698 (1942);

[A4] F. Zernike, "Phase contrast, a new method for the microscopic observation of transparent objects Part II," Physica 9, 974-986 (1942);

[A5] G. Nomarski, and A. R. Weill, "Application à la métallographie des méthodes interférentielles à deux ondes polarisées," Rev. Metall. 2, 121-128 (1955);

[A6] W. Shimada, T. Sato, and T. Yatagai, "Optical surface microtopography using phase-shifting Nomarski microscope," Proc. SPIE 1332, 525-529 (1990);

[A7] P. Hariharan, and M. Roy, "Achromatic phase-shifting for two-wavelength phase-stepping interferometry," Opt. Comm. 126, 220-222 (1996);

[A8] C. J. Cogswell, N. I. Smith, K. G. Larkin, and P. Hariharan, "Quantitative DIC microscopy using a geometric phase shifter," Proc. SPIE 2984, 72-81 (1997);

[A9] M. R. Arnison, C. J. Cogswell, N. I. Smith, P. W. Fekete, and K. G. Larkin, "Using the Hilbert transform for 3D visualization of differential interference contrast microscope images," J. of Microsc.-Oxford 199, 79-84 (2000);

[A10] M. R. Arnison, K. G. Larkin, C. J. R. Sheppard, N. I. Smith, and C. J. Cogswell, "Linear phase imaging using differential interference contrast microscopy," J. of Microsc.-Oxford 214, 7-12 (2004);

[A11] H. Ishiwata, M. Itoh, and T. Yatagai, "A new method of three-dimensional measurement by differential interference contrast microscope," Opt. Comm. 260, 117-126 (2006).

[A12] U. Schnars, and W. Juptner, "Direct Recording of Holograms by a Ccd Target and Numerical Reconstruction," Appl. Opt. 33, 179-181 (1994);

[A13] E. Cuche, F. Bevilacqua, and C. Depeursinge, "Digital holography for quantitative phase-contrast imaging," Opt. Lett. 24, 291-293 (1999);

[A14] G. Popescu, T. Ikeda, C. A. Best, K. Badizadegan, R. R. Dasari, and M. S. Feld, "Erythrocyte structure and dynamics quantified by Hilbert phase microscopy," J. Biomed. Opt. 10, (2005);

[A15] T. Ikeda, G. Popescu, R. R. Dasari, and M. S. Feld, "Hilbert phase microscopy for investigating fast dynamics in transparent systems," Opt. Lett. 30, 1165-1167 (2005);

[A16] D. S. Marx, and D. Psaltis, "Polarization quadrature measurement of subwavelength diffracting structures," Appl. Opt. 36, 6434-6440 (1997);

[A17] D. O. Hogenboom, C. A. DiMarzio, T. J. Gaudette, A. J. Devaney, and S. C. Lindberg, "Three-dimensional images generated by quadrature interferometry," Opt. Lett. 23, 783-785 (1998);

[A18] M. A. Choma, "Instantaneous quadrature low-coherence interferometry with 3×3 fiber-optic couplers," Opt. Lett. 28, 2162-2164 (2003);

[A19] Z. Yaqoob, J. Fingler, X. Heng, and C. H. Yang, "Homodyne en face optical coherence tomography," Opt. Lett. 31, 1815-1817 (2006);

[A20] B. L. Danielson, and C. Y. Boisrobert, "Absolute optical ranging using low coherence interferometry," Appl. Opt. 30, 2975-2979 (1991);

[A21] V. V. Tuchin, "Coherence-domain methods in tissue and cell optics," Laser Phys. 8, 807-849 (1998);

[A22] S. R. Thurber, A. M. Brodsky, and L. W. Burgess, "Characterization of random media by low-coherence interferometry," Appl. Spectrosc. 54, 1506-1514 (2000);

[A23] D. Huang, E. A. Swanson, C. P. Lin, J. S. Schuman, W. G. Stinson, W. Chang, M. R. Hee, T. Flotte, K. Gregory, C. A. Puliafito, and J. G. Fujimoto, "Optical coherence tomography," Science 254, 1178-1181 (1991);

[A24] C. M. B. Cordeiro, L. Cescato, A. A. Freschi, and L. F. Li, "Measurement of phase differences between the diffracted orders of deep relief gratings," Opt. Lett. 28, 683-685 (2003);

[B1] K. Creath, "Phase-shifting interferometry techniques," Progress in Optics XXVI, 349-393 (1998);

[B2] P. Marquet, B. Rappaz, P. J. Magistretti et al., "Digital holographic microscopy: a noninvasive contrast imaging technique allowing quantitative visualization of living cells with subwavelength axial accuracy," Optics Letters 30 (5), 468-470 (2005);

[B3] T. Ikeda, G. Popescu, R. R. Dasari et al., "Hilbert phase microscopy for investigating fast dynamics in transparent systems," Optics Letters 30 (10), 1165-1167 (2005);

[B4] D. O. Hogenboom, C. A. DiMarzio, T. J. Gaudette et al., "Three-dimensional images generated by quadrature interferometry," Optics Letters 23 (10), 783-785 (1998);

[B5] Z. Yaqoob, J. G. Wu, X. Q. Cui et al., "Harmonically-related diffraction gratings-based interferometer for quadrature phase measurements," Optics Express 14 (18), 8127-8137 (2006);

[B6] J. Atencia and D. J. Beebe, "Controlled microfluidic interfaces," Nature 437 (7059), 648-655 (2005);

[C1] D. Huang, E. A. Swanson, C. P. Lin, J. S. Schuman, W. G. Stinson, W. Chang, M. R. Hee, T. Flotte, K. Gregory, C. A. Puliafito, and J. G. Fujimoto, "Optical coherence tomography," *Science,* vol. 254, pp. 1178-1181, 1991;

[C2] M. R. Hee, J. A. Izatt, J. M. Jacobson, J. G. Fujimoto, and E. A. Swanson, "Femtosecond Transillumination Optical Coherence Tomography," *Optics Letters,* vol. 18, pp. 950-952, 1993;

[C3] A. F. Fercher, C. K. Hitzenberger, G. Kamp, and S. Y. Elzaiat, "Measurement of Intraocular Distances by Backscattering Spectral Interferometry," *Optics Communications,* vol. 117, pp. 43-48, 1995;

[C4] G. Hausler and M. W. Lindner, ""Coherence Radar" and "Spectral Radar"—New Tools for Dermatological Diagnosis," *Journal of Biomedical Optics,* vol. 3, pp. 21, 1998;

[C5] M. Wojtkowski, A. Kowalczyk, P. Targowski, and I. Gorczynska, "Fourier-domain optical coherence tomography: next step in optical imaging," *Optica Applicata*, vol. 32, pp. 569-580, 2002;

[C6] R. Huber, M. Wojtkowski, K. Taira, J. G. Fujimoto, and K. Hsu, "Amplified, frequency swept lasers for frequency domain reflectometry and OCT imaging: design and scaling principles," *Optics Express*, vol. 13, pp. 3513-3528, 2005;

[C7] M. A. Choma, M. Sarunic, C. Yang, and J. A. Izatt, "Sensitivity advantage of swept source and Fourier domain optical coherence tomography," *Optics Express*, vol. 11, pp. 2183-2189, 2003;

[C8] R. Leitgeb, C. K. Hitzenberger, and A. F. Fercher, "Performance of fourier domain vs. time domain optical coherence tomography," *Optics Express*, vol. 11, pp. 889-894, 2003;

[C9] J. F. de Boer, B. Cense, B. H. Park, M. C. Pierce, G. J. Tearney, and B. E. Bouma, "Improved signal-to-noise ratio in spectral-domain compared with time-domain optical coherence tomography," *Optics Letters*, vol. 28, pp. 2067-2069, 2003;

[C10] S. Yun, G. Tearney, B. Bouma, B. Park, and J. F. de Boer, "High-speed spectral domain optical coherence tomography at 1.3 μm wavelength," *Optics Express*, vol. 11, pp. 3598-3604, 2003;

[C11] N. A. N. B. Cense, T. C. Chen, M. C. Pierce, S.-H. Yun, B. H. Park, B. E. Bouma, G. J. Tearney, J. F. de Boer, "Ultrahigh-resolution high-speed retinal imaging using spectral-domain optical coherence tomography," *Optics Express*, vol. 12, pp. 2435-2447, 2004;

[C12] M. Wojtkowski, V. J. Srinivasan, T. H. Ko, J. G. Fujimoto, A. Kowalczyk, and J. S. Duker, "Ultrahigh-resolution, high-speed, Fourier domain optical coherence tomography and methods for dispersion compensation," *Optics Express*, vol. 12, pp. 2404-2422, 2004;

[C13] W. Y. Oh, S. H. Yun, B. J. Vakoc, G. J. Tearney, and B. E. Bouma, "200 frames per second optical frequency domain imaging using an ultrahigh-speed linear-cavity wavelength-swept laser," presented at Coherence Domain Optical Methods and Optical Coherence Tomography in Biomedicine X, BIOS 2006, Photonics West, San Jose, Calif., USA, 2006;

[C14] J. F. deBoer, T. E. Milner, M. J. C. vanGemert, and J. S. Nelson, "Two-dimensional birefringence imaging in biological tissue by polarization-sensitive optical coherence tomography," *Optics Letters*, vol. 22, pp. 934-936, 1997;

[C15] J. A. Izatt, M. D. Kulkarni, S. Yazdanfar, J. K. Barton, and A. J. Welch, "In vivo bi-directional color Doppler flow imaging of picoliter blood volumes using optical coherence tomography," *Optics Letters*, vol. 22, pp. 4139-4141, 1997;

[C16] R. Leitgeb, M. Wojtkowski, A. Kowalczyk, C. K. Hitzenberger, M. Sticker, and A. F. Fercher, "Spectral measurement of absorption by spectroscopic frequency-domain optical coherence tomography," *Optics Letters*, vol. 25, pp. 820-822, 2000;

[C17] K. D. Rao, M. A. Choma, S. Yazdanfar, A. M. Rollins, and J. A. Izatt, "Molecular contrast in optical coherence tomography by use of a pump-probe technique," *Optics Letters*, vol. 28, pp. 340-342, 2003;

[C18] M. Wojtkowski, A. Kowalczyk, R. Leitgeb, and A. F. Fercher, "Full range complex spectral optical coherence tomography technique in eye imaging," *Optics Letters*, vol. 27, pp. 1415-1417, 2002;

[C19] R. A. Leitgeb, C. K. Hitzenberger, A. F. Fercher, and T. Bajraszewski, "Phase-shifting algorithm to achieve high-speed long-depth-range probing by frequency-domain optical coherence tomography," *Optics Letters*, vol. 28, pp. 2201-2203, 2003;

[C20] E. Gotzinger, M. Pircher, R. A. Leitgeb, and C. K. Hitzenberger, "High speed full range complex spectral domain optical coherence tomography," *Optics Express*, vol. 13, pp. 583-594, 2005;

[C21] A. H. Bachmann, R. A. Leitgeb, and T. Lasser, "Heterodyne Fourier domain optical coherence tomography for full range probing with high axial resolution," *Optics Express*, vol. 14, pp. 1487-1496, 2006;

[C22] M. A. Choma, "Instantaneous quadrature low-coherence interferometry with 3×3 fiber-optic couplers," *Optics Letters*, vol. 28, pp. 2162-2164, 2003;

[C23] M. V. Sarunic, M. A. Choma, C. H. Yang, and J. A. Izatt, "Instantaneous complex conjugate resolved spectral domain and swept-source OCT using 3×3 fiber couplers," *Optics Express*, vol. 13, pp. 957-967, 2005;

[C24] Z. Yaqoob, J. Fingler, X. Heng, and C. H. Yang, "Homodyne en face optical coherence tomography," *Optics Letters*, vol. 31, pp. 1815-1817, 2006;

[C25] Z. Yaqoob, J. Wu, X. Cui, X. Heng, and C. Yang, "Harmonically-related diffraction gratings-based interferometer for quadrature phase measurements," *Optics Express*, 14(18), pp. 8127-8137, 2006;

[C26] J. M. Herrmann, M. E. Brezinski, B. E. Bouma, S. A. Boppart, C. Pitris, J. F. Southern, and J. G. Fujimoto, "Two- and three-dimensional high-resolution imaging of the human oviduct with optical coherence tomography," *Fertility and Sterility*, vol. 70, pp. 155-158, 1998;

[C27] C. K. Hitzenberger, P. Trost, P. W. Lo, and Q. Y. Zhou, "Three-dimensional imaging of the human retina by high-speed optical coherence tomography," *Optics Express*, vol. 11, pp. 2753-2761, 2003;

[C28] G. J. Tearney, B. E. Bouma, and J. G. Fujimoto, "High-speed phase- and group-delay scanning with a grating-based phase control delay line," *Optics Letters*, vol. 22, pp. 1811-1813, 1997; and

[C29] A. M. Rollins, M. D. Kulkarni, S. Yazdanfar, R. Ung-arunyawee, and J. A. Izatt, "In vivo video rate optical coherence tomography," *Optics Express*, vol. 3, pp. 219, 1998.

What is claimed is:

1. A beam splitter/combiner used to acquire phase measurements, comprising:
   a first shallow diffraction grating and a second shallow diffraction grating that are harmonically-related, wherein:
   the first grating and the second grating are aligned such that grating planes and grating vectors of the first and second gratings are parallel to that of each other; and
   a phase shift at two or more output ports of a resulting interferometer is adjustable by shearing the first grating with respect to the second grating; and
   the phase shift is non-trivial.

2. The beam splitter/combiner of claim 1, wherein:
   the beam splitter/combiner is utilized in a Michelson interferometer; and
   the beam splitter/combiner produces interference signals at three output ports of the interferometer, wherein the phase shift between at least two of the three output ports is non-trivial.

3. The beam splitter/combiner of claim 1, wherein the first and second diffraction gratings are holographically recorded simultaneously on a single substrate.

4. The beam splitter/combiner of claim 1, wherein the beam splitter/combiner is utilized in a Mach-Zehnder interferometer for full field phase imaging of a phase object, the Mach-Zehnder interferometer comprising:

a lens L1 configured to collimate a filtered laser beam; and a pair of lenses that create a microscope system that images the phase object onto two CCD (charge coupled device) cameras.

5. The beam splitter/combiner of claim 4, wherein the phase object comprises two bars of PMMA (polymethyl methacrylate) material on a glass plate.

6. The beam splitter/combiner of claim 4, wherein the phase object is a microfluidic channel and the Mach-Zehnder interferometer is utilized to observe liquid diffusion in the microfluidic channel.

7. The beam splitter/combiner of claim 1, wherein:

the beam splitter/combiner is utilized in a spectrometer-based optical coherence tomography (OCT) system;

the beam splitter/combiner is used to split a collimated beam into a sample and reference beam;

a spherical lens L1 focuses an incident light beam and collects back scattered light from a sample;

a spherical lens L2 collects angularly dispersed reference light;

the back scattered light and the reference light undergo a diffraction at the beam splitter/combiner where the back scattered light and the reference light are split and combined at output ports; and lenses L3 and L4 collect and focus light from the output ports onto CCD (charge coupled device) arrays.

8. A method for fabricating a beam splitter/combiner used for acquiring phase measurements comprising:

recording a first shallow diffraction grating and a second shallow diffraction grating on a substrate, wherein:

the first grating and the second grating are harmonically related;

the first grating and the second grating are aligned such that grating planes and grating vectors of the first and second gratings are parallel to that of each other; and a phase shift at two or more output ports of a resulting interferometer is adjustable by shearing the first grating with respect to the second grating; and the phase shift is non-trivial.

9. The method of claim 8, wherein the first and second gratings constitute a beam splitter/combiner, the method further comprising:

utilizing the beam splitter/combiner in a Michelson interferometer; and the beam splitter/combiner producing interference signals at three output ports of the interferometer, wherein the phase shift between at least two of the three output ports is non-trivial.

10. The method of claim 8, wherein the first and second diffraction gratings are holographically recorded simultaneously on a single substrate.

11. The method of claim 8, wherein the first and second gratings constitute a beam splitter/combiner, the method further comprising:

conduct a full field phase imaging of a phase object utilizing the beam splitter/combiner in a Mach-Zehnder interferometer, the Mach-Zehnder interferometer comprising:

a lens L1 configured to collimate a filtered laser beam; and a pair of lenses that create a microscope system that images the phase object onto two CCD (charge coupled device) cameras.

12. The method of claim 11, wherein the phase object comprises two bars of PMMA (polymethyl methacrylate) material on a glass plate.

13. The method of claim 11, wherein the phase object is a microfluidic channel and the Mach-Zehnder interferometer is utilized to observe liquid diffusion in the microfluidic channel.

14. The method of claim 8, wherein the first and second gratings constitute a beam splitter/combiner, the method further comprising:

utilizing the beam splitter/combiner in a spectrometer-based optical coherence tomography (OCT) system;

the beam splitter/combiner splitting a collimated beam into a sample and reference beam;

a spherical lens L1 focusing an incident light beam and collecting back scattered light from a sample;

a spherical lens L2 collecting angularly dispersed reference light;

the back scattered light and the reference light undergoing a diffraction at the beam splitter/combiner where the back scattered light and the reference light are split and combined at output ports; and lenses L3 and L4 collecting and focusing light from the output ports onto CCD (charge coupled device) arrays.

* * * * *